(12) United States Patent
Imai et al.

(10) Patent No.: US 6,507,611 B1
(45) Date of Patent: Jan. 14, 2003

(54) TRANSMITTING APPARATUS AND METHOD, RECEIVING APPARATUS AND METHOD, AND PROVIDING MEDIUM

(75) Inventors: Kenichi Imai, Tokyo (JP); Minoru Tsuji, Chiba (JP); Takashi Koike, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/299,509

(22) Filed: Apr. 26, 1999

(30) Foreign Application Priority Data

May 8, 1998 (JP) ............................................ 10-125633

(51) Int. Cl.$^7$ .............................. H04B 1/38; H04L 5/16
(52) U.S. Cl. ........................ 375/222; 375/220; 375/219
(58) Field of Search ................................ 375/219, 220, 375/221, 222, 257; 370/537, 469, 453

(56) References Cited

U.S. PATENT DOCUMENTS

| 4,931,250 | A | * | 6/1990 | Greszczuk ................... 375/222 |
| 5,687,157 | A | | 11/1997 | Imai et al. ................... 369/124 |
| 5,848,384 | A | | 12/1998 | Hollier et al. ............... 704/831 |
| 5,960,035 | A | * | 9/1999 | Sridhar et al. ............... 375/219 |
| 6,021,158 | A | * | 2/2000 | Schurr et al. ................ 375/211 |
| 6,236,676 | B1 | * | 5/2001 | Shaffer et al. ............... 375/222 |

FOREIGN PATENT DOCUMENTS

JP         9-127989         5/1997    ............. G10L/9/14

* cited by examiner

*Primary Examiner*—Phuong Phu
(74) *Attorney, Agent, or Firm*—Sonnenschein, Nath & Rosenthal

(57) ABSTRACT

The invention intends to decode and reproduce digital audio signals in real time. A transmission rate of a transmission line is detected, and a selection instructing unit instructs, to an encoding selecting circuit, a coding method which can provide coded data having a bit rate corresponding to the detected transmission rate. In response to the instruction from the selection instructing unit, the encoding selecting circuit controls a switch so as to select one of a plurality of encoders for encoding an audio signal with different coding methods. Each frame of the audio signal cut out by a frame cutting circuit is supplied to the encoder selected by the switch for encoding thereof. Resulting coded data is outputted after an ID representing the instructed coding method has been added to the coded data in a header inserting circuit.

48 Claims, 17 Drawing Sheets

FIG. 6

| IDm | CODED DATA OUTPUTTED FROM ENCODER 53m |
|---|---|

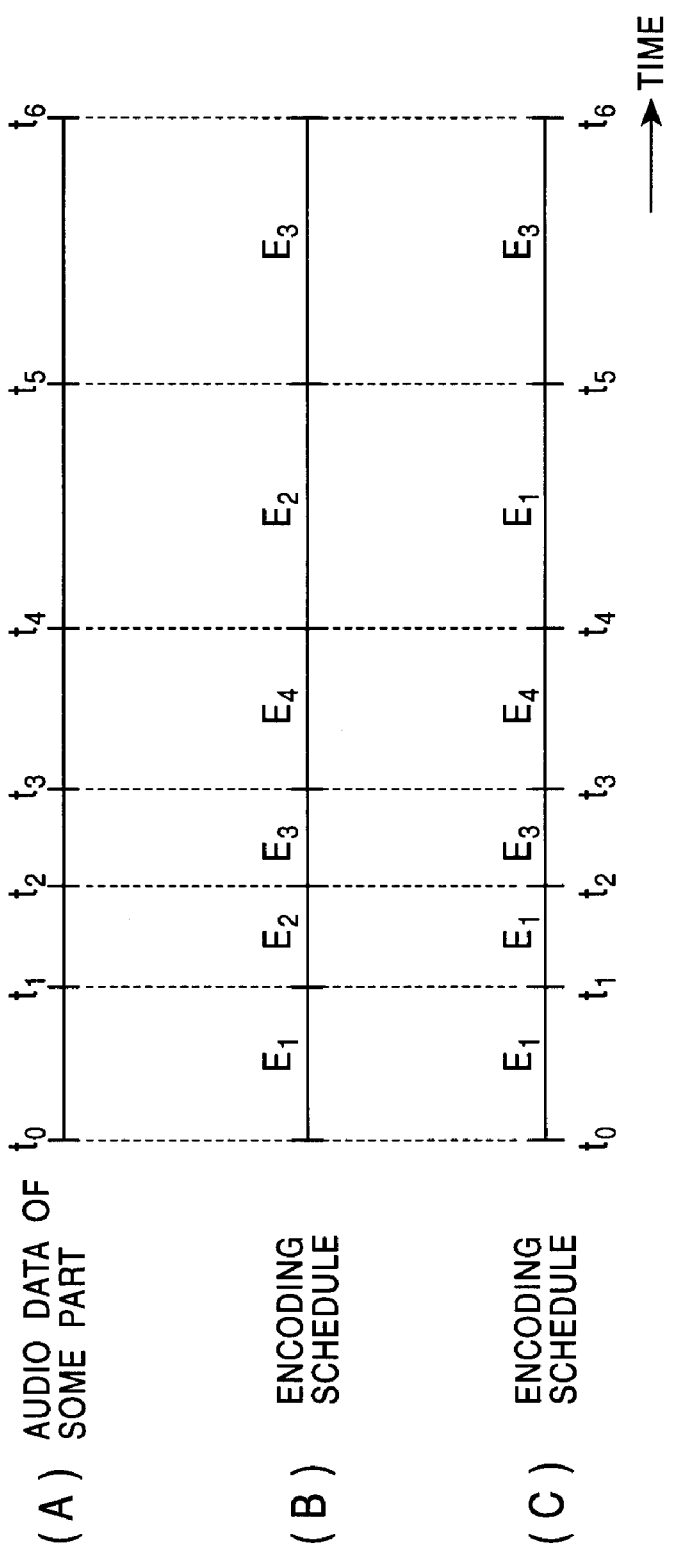

TRANSMITTING APPARATUS AND METHOD, RECEIVING APPARATUS AND METHOD, AND PROVIDING MEDIUM

BACKGROUND OF THE INVENTION

1. Field of the Invention

The present invention relates to a transmitting apparatus and method, a receiving apparatus and method, and a providing medium. More particularly, the present invention relates to a transmitting apparatus and method, a receiving apparatus and method, and a providing medium which are suitably used, for example, in the case of encoding and transmitting time-series digital signals such as audio signals, and receiving and decoding the digital signals to reproduce them in real time on the receiving side.

2. Description of the Related Art

For example, when digital signals such as digital audio signals are transmitted from the transmitting side to the receiving side via a network, e.g., Internet, it is customary that the digital signals are transmitted after being compressed and encoded into coded data on the transmitting side, and the coded data is decoded on the receiving side, because the data rate of the digital signals is higher than the transmission band (i.e., the transmission rate) of the network. Such transmission and reception of digital signals is performed on the premise that the receiving side includes a decoder corresponding to an encoder provided on the transmitting side.

Coded data resulted from encoding made by an encoder on the transmitting side is transmitted to the receiving side via a network as mentioned above, but the transmission rate of the coded data in the network generally varies due to the amount of traffic, etc. Apart from the case where the coded data is all downloaded and then decoded on the receiving side, therefore, it may occur in the case of decoding the coded data while receiving the same that the transmission of the coded data becomes too late to decode and reproduce the audio signals in real time if the transmission rate of the network lowers below the data rate of the coded data.

Also, although a system of Internet or any other network is designed so as to avoid the transmission of the coded data from becoming too late as far as possible, it is nevertheless sometimes difficult to decode and reproduce audio signals in real time due to, e.g., the ability of hardware and the decoding method of a decoder on the receiving side.

More specifically, for example, when the coding method of an encoder on the transmitting side is complex, the decoding method of a decoder for decoding the coded data, which has been encoded by the encoder, is also usually complex. In such a case, if hardware on the receiving side has not a processing ability capable of coping with the complex decoding method, decoding of audio signals would be too late for the start of reproduction thereof. Further, the processing time required for the decoder to decode the coded data is greatly affected by the processing ability of hardware on the receiving side. Accordingly, if the processing ability of hardware on the receiving side is lower than expected by the transmitting side, the time taken for decoding the coded data would be longer than expected by the transmitting side, thus resulting in a difficulty in decoding and reproducing the audio signals in real time.

SUMMARY OF THE INVENTION

The present invention has been made in view of the state of art set forth above, and intends to decode and reproduce digital signals in real time.

According to a first aspect of the present invention, in a transmitting apparatus for outputting coded data resulted from encoding a time-series digital signal, the transmitting apparatus comprises a plurality of coding means for encoding the digital signal with a plurality of coding methods and outputting the coded data, instructing means for instructing, from among the plurality of coding methods, one for encoding a part or the whole of the digital signal, selecting means for selecting the coded data obtained with the coding method instructed from the instructing means, adding means for adding, to the coded data selected by the selecting means, coding method information indicating the coding method used for obtaining the selected coded data, and outputting means for outputting the selected coded data added with the coding method information.

According to a second aspect of the present invention, in a transmitting method for use in a transmitting apparatus for outputting coded data resulted from encoding a time-series digital signal, the transmitting apparatus comprises a plurality of coding means for encoding the digital signal with a plurality of coding methods and outputting the coded data, and the transmitting method comprises an instructing step of instructing, from among the plurality of coding methods, one for encoding a part or the whole of the digital signal, a selecting step of selecting the coded data obtained with the coding method instructed in the instructing step, an adding step of adding, to the coded data selected in the selecting step, coding method information indicating the coding method used for obtaining the selected coded data, and an outputting step of outputting the selected coded data added with the coding method information.

According to a third aspect of the present invention, in a providing medium for providing a computer program for rendering a computer to execute processing to output coded data resulted from encoding a time-series digital signal, the computer comprises a plurality of coding means for encoding the digital signal with a plurality of coding methods and outputting the coded data, and the computer program includes an instructing step of instructing, from among the plurality of coding methods, one for encoding a part or the whole of the digital signal, a selecting step of selecting the coded data obtained with the coding method instructed in the instructing step, an adding step of adding, to the coded data selected in the selecting step, coding method information indicating the coding method used for obtaining the selected coded data, and an outputting step of outputting the selected coded data added with the coding method information.

According to a fourth aspect of the present invention, in a receiving apparatus for receiving and processing coded data resulted from encoding a part or the whole of a time-series digital signal with one of a plurality of coding methods, the receiving apparatus comprises extracting means for extracting coding method information added to the coded data and indicating the coding method used for obtaining the coded data, recognizing means for recognizing a decoding method for decoding the coded data based on the coding method information, and decoding means for decoding the coded data with the decoding method recognized by the recognizing means.

According to a fifth aspect of the present invention, in a receiving method for receiving and processing coded data resulted from encoding a part or the whole of a time-series digital signal with one of a plurality of coding methods, the receiving method comprises an extracting step of extracting coding method information added to the coded data and indicating the coding method used for obtaining the coded data, a recognizing step of recognizing a decoding method for decoding the coded data based on the coding method information, and a decoding step for decoding the coded data with the decoding method recognized in the recognizing step.

According to a sixth aspect of the present invention, in a providing medium for providing a computer program for rendering a computer to process coded data resulted from encoding a part or the whole of a time-series digital signal with one of a plurality of coding methods, the computer program includes an extracting step of extracting coding method information added to the coded data and indicating the coding method used for obtaining the coded data, a recognizing step of recognizing a decoding method for decoding the coded data based on the coding method information, and a decoding step for decoding the coded data with the decoding method recognized in the recognizing step.

According to a seventh aspect of the present invention, in a providing medium for providing coded data resulted from encoding a time-series digital signal, the providing medium provides coded data and coding method information that are obtained by instructing, from among a plurality of coding methods, one for encoding a part or the whole of the digital signal, selecting the coded data resulted from encoding the digital signal with the instructed coding method, and adding, to the selected coded data, coding method information indicating the coding method used for obtaining the selected coded data.

According to an eighth aspect of the present invention, in a transmitting apparatus for transmitting coded data resulted from encoding a digital signal via a predetermined transmission line, the transmitting apparatus comprises a plurality of coding means for encoding the digital signal with a plurality of coding methods and outputting the coded data, detecting means for detecting a transmission rate of the transmission line, selecting means for selecting one of the plurality of coding methods which is able to provide coded data having a bit rate corresponding to the transmission rate of the transmission line, and transmitting means for transmitting the coded data obtained with the coding method selected by selecting means.

According to a ninth aspect of the present invention, in a transmitting method for use in a transmitting apparatus for transmitting coded data resulted from encoding a digital signal via a predetermined transmission line, the transmitting apparatus comprises a plurality of coding means for encoding the digital signal with a plurality of coding methods and outputting the coded data, and the transmitting method comprises a detecting step of detecting a transmission rate of the transmission line, a selecting step of selecting one of the plurality of coding methods which is able to provide coded data having a bit rate corresponding to the transmission rate of the transmission line, and a transmitting step of transmitting the coded data obtained with the coding method selected in the selecting step.

According to a tenth aspect of the present invention, in a providing medium for providing a computer program for rendering a computer to execute processing to transmit coded data resulted from encoding a digital signal via a predetermined transmission line, the computer comprises a plurality of coding means for encoding the digital signal with a plurality of coding methods and outputting the coded data, and the computer program includes a detecting step of detecting a transmission rate of the transmission line, a selecting step of selecting one of the plurality of coding methods which is able to provide coded data having a bit rate corresponding to the transmission rate of the transmission line, and a transmitting step of transmitting the coded data obtained with the coding method selected in the selecting step.

According to an eleventh aspect of the present invention, in a receiving apparatus for receiving coded data resulted from encoding a digital signal via a predetermined transmission line, the receiving apparatus comprises receiving means for receiving the coded data encoded by a coding method capable of providing data having a bit rate corresponding to a transmission rate of the transmission line, and decoding means for decoding the coded data.

According to a twelfth aspect of the present invention, in a receiving method for receiving coded data resulted from encoding a digital signal via a predetermined transmission line, the receiving method comprises a receiving step of receiving the coded data encoded by a coding method capable of providing data having a bit rate corresponding to a transmission rate of the transmission line, and a decoding step of decoding the coded data.

According to a thirteenth aspect of the present invention, in a providing medium for providing a computer program for rendering a computer to execute processing to receive coded data resulted from encoding a digital signal via a predetermined transmission line, the computer program includes a receiving step of receiving the coded data encoded by a coding method capable of providing data having a bit rate corresponding to a transmission rate of the transmission line, and a decoding step of decoding the coded data.

BRIEF DESCRIPTION OF THE DRAWINGS

FIG. 6 is a diagram showing a format of data outputted from a header inserting circuit 54 in FIG. 5.

FIGS. 11A to 11C are charts for explaining change of an encoding schedule.

DESCRIPTION OF THE PREFERRED EMBODIMENTS

Embodiments of the present invention will be described below.

Figure 1:
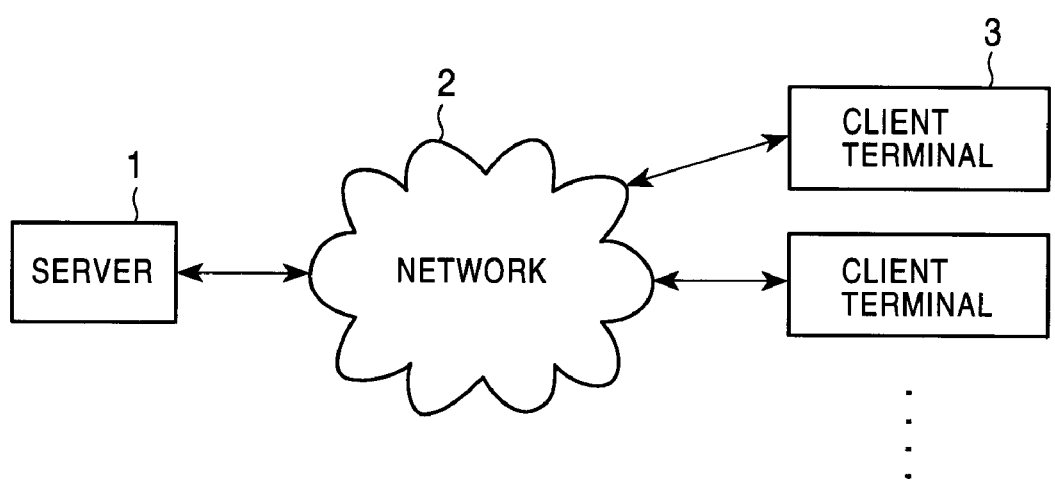
FIG. 1 is a diagram showing an exemplified construction of one embodiment of a transmission system to which the present invention is applied.

FIG. 1 shows an exemplified construction of one embodiment of a transmission system (the term "system" means a plurality of devices assembled together in a logical correlation regardless of whether the devices having their own constructions are all positioned in the same housing or not) to which the present invention is applied.

In the transmission system, when a request for time-series digital signals, e.g., digital audio signals, is issued from a client terminal 3 to a server 1 via a network 2 such as Internet, ISDN (Integrated Service Digital Network) or PSTN (Public Switched Telephone Network), the server 1 encodes the requested audio signals with a predetermined coding method, and resulting coded data is transmitted to the client terminal 3 via the network 2. After receiving the coded data from the server 1, the client terminal 3 decodes the coded data and reproduces the original audio signals in real time, for example, (so-called streaming reproduction).

Figure 2:
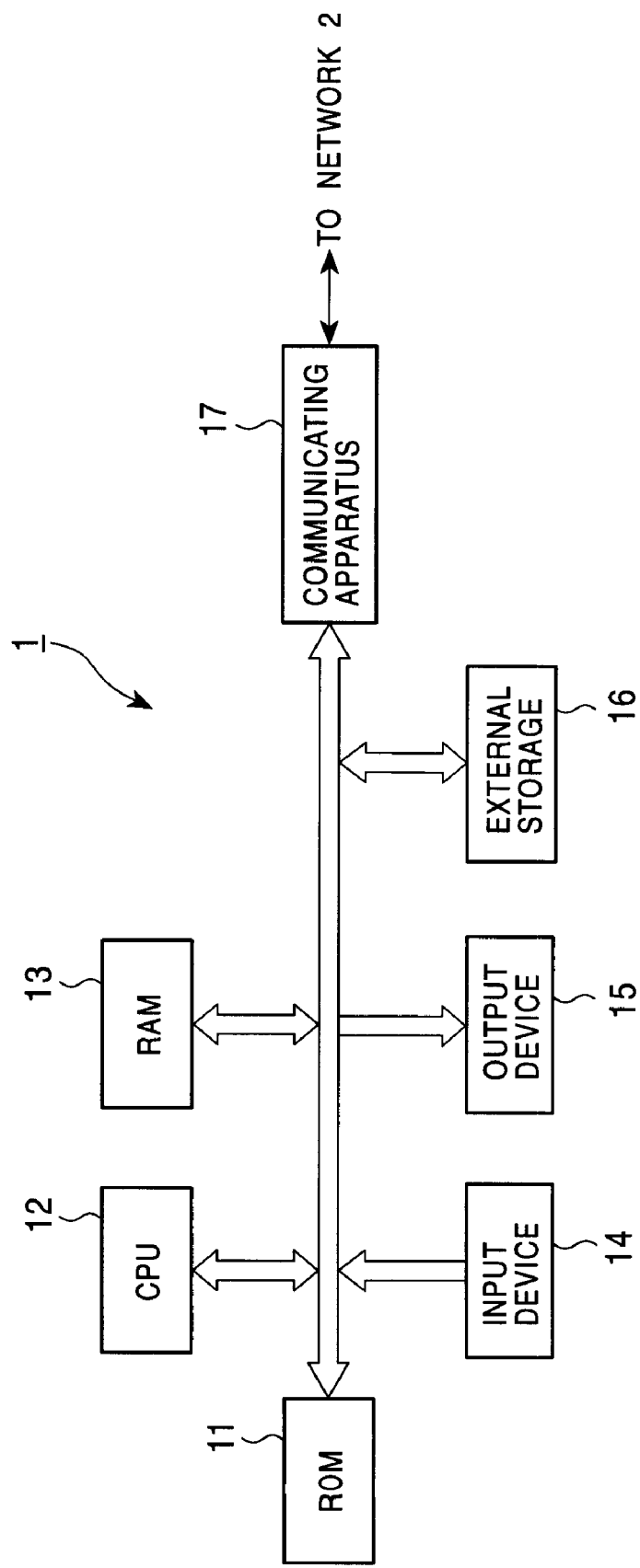
FIG. 2 is a block diagram showing an exemplified construction of hardware of a server 1 in FIG. 1.

FIG. 2 shows an exemplified construction of hardware of the server 1 in FIG. 1.

A ROM (Read Only Memory) 11 stores, for example, an IPL (Initial Program Loading) program and so on. A CPU (Central Processing Unit) 12 executes an OS (Operating System), which is stored (recorded) in an external storage 16, in accordance with the IPL program stored in the ROM 11, and also executes various application programs, which are stored in the external storage 16, under control of the OS, thereby carrying out a coding process of audio signals, a transmitting process of coded data resulted from the coding process to the client terminal 3, etc. A RAM (Random Access Memory) 13 stores programs, data and so on which are necessary for operation of the CPU 12. An input device 14 is constructed of, e.g., a keyboard, a mouse, a microphone or an external interface, and is operated when necessary data or command is inputted. The input device 14 is also constructed to function as an interface for accepting input of digital audio signals externally applied to the client terminal 3. An output device 15 is constructed of, e.g., a display, a speaker or a printer, and displays or outputs necessary information. The external storage 16 comprises a hard disk, for example, and stores the OS and the application programs mentioned above. Program modules provided to the client terminal 3 and serving as decoders, described above, are also stored in the external storage 16. In addition, the external storage 16 stores other data including data necessary for operation of the CPU 22, etc. A communicating apparatus 17 carries out control required for communication via the network 2.

Figure 3:
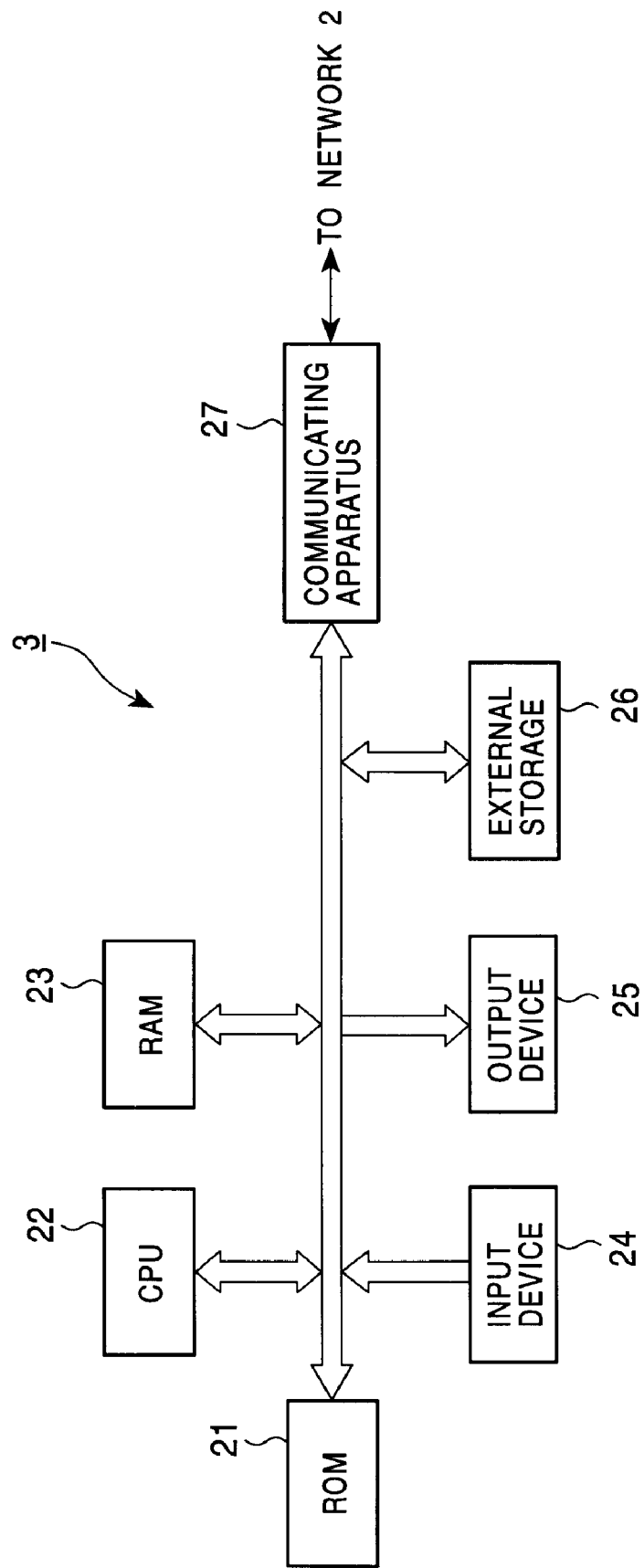
FIG. 3 is a block diagram showing an exemplified construction of hardware of a client terminal 3 in FIG. 1.

FIG. 3 shows an exemplified construction of hardware of the client terminal 3 in FIG. 1.

The client terminal 3 is made up of illustrated components 21–27, i.e., a ROM 21 to a communicating apparatus 27, and has a construction basically similarly to that of the server 1 made up of the ROM 11 to the communicating apparatus 17.

Unlike the server 1, an external storage 26 stores, as application programs, a program for decoding the coded data transmitted from the server 1, programs for executing later-described processing, and so on. A CPU 22 executes those application programs to, for example, perform a decoding process of the coded data.

Figure 4:
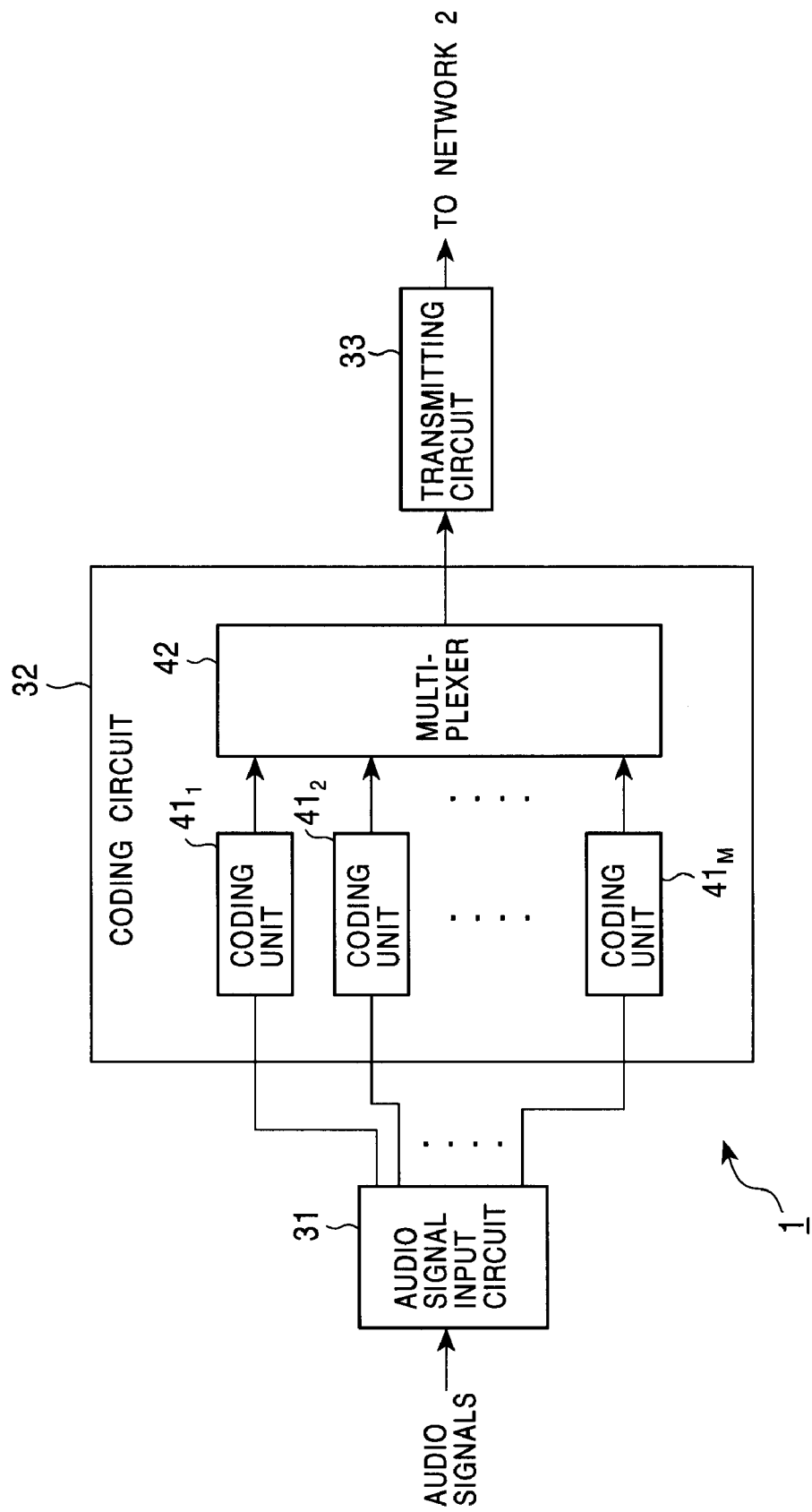
FIG. 4 is a block diagram showing an exemplified functional construction of the server 1 in FIG. 2.

FIG. 4 shows an exemplified functional construction of the server 1 in FIG. 2. The illustrated construction is basically realized upon the CPU 12 executing the application programs stored in the external storage 16.

Audio signals to be provided to the client terminal 3 are supplied to an audio signal input circuit 31. In the audio signal input circuit 31, analog audio signals are A/D-converted into digital audio signals. Then, the audio signal input circuit 31 separates the digital audio signals for each of channels, for example, and supplies them to a coding circuit 32.

More specifically, audio signals of a piece of music, for example, are separated for each of respective parts of guitar, piano, drum, song (words), etc. that constitute the piece of music together, and are inputted to the audio signal input circuit 31 in a synchronous relation. The audio signal input circuit 31 outputs the audio signals of individual parts respectively as the audio signals of individual channels.

Note that audio signals of two or more parts may be inputted to the audio signal input circuit 31 in a mixed condition. In this case, the audio signal input circuit 31 outputs the audio signals in the mixed condition.

Also, audio signals inputted to the audio signal input circuit 31 may be in the form of, e.g., MIDI (Musical Instrument Digital Interface) data (i.e., data for controlling a MIDI sound source) rather than the actual audio signals.

The coding circuit 32 encodes the audio signals from the audio signal input circuit 31 at high efficiency.

More specifically, in the embodiment shown in FIG. 4, the coding circuit 32 comprises a number M of coding units $41_1$ to $41_M$ and a multiplexer 42. The coding unit $41_m$ (m=1, 2, . . . , M) is supplied with the audio signal of each corresponding channel from the audio signal input circuit 31. The coding unit $41_m$ encodes the audio signal from the audio signal input circuit 31, and supplies resulting coded data to the multiplexer 42. The multiplexer 42 multiplexes a number M of coded data outputted from the coding units $41_1$ to $41_M$ respectively into one line, and supplies them as multiplexed data to a transmitting circuit 33.

The transmitting circuit 33 converts the multiplexed data into a format corresponding to the communication protocol adapted for transmitting it via the network 2, and transmits resulting data to the client terminal 3 via the network 2.

Figure 5:
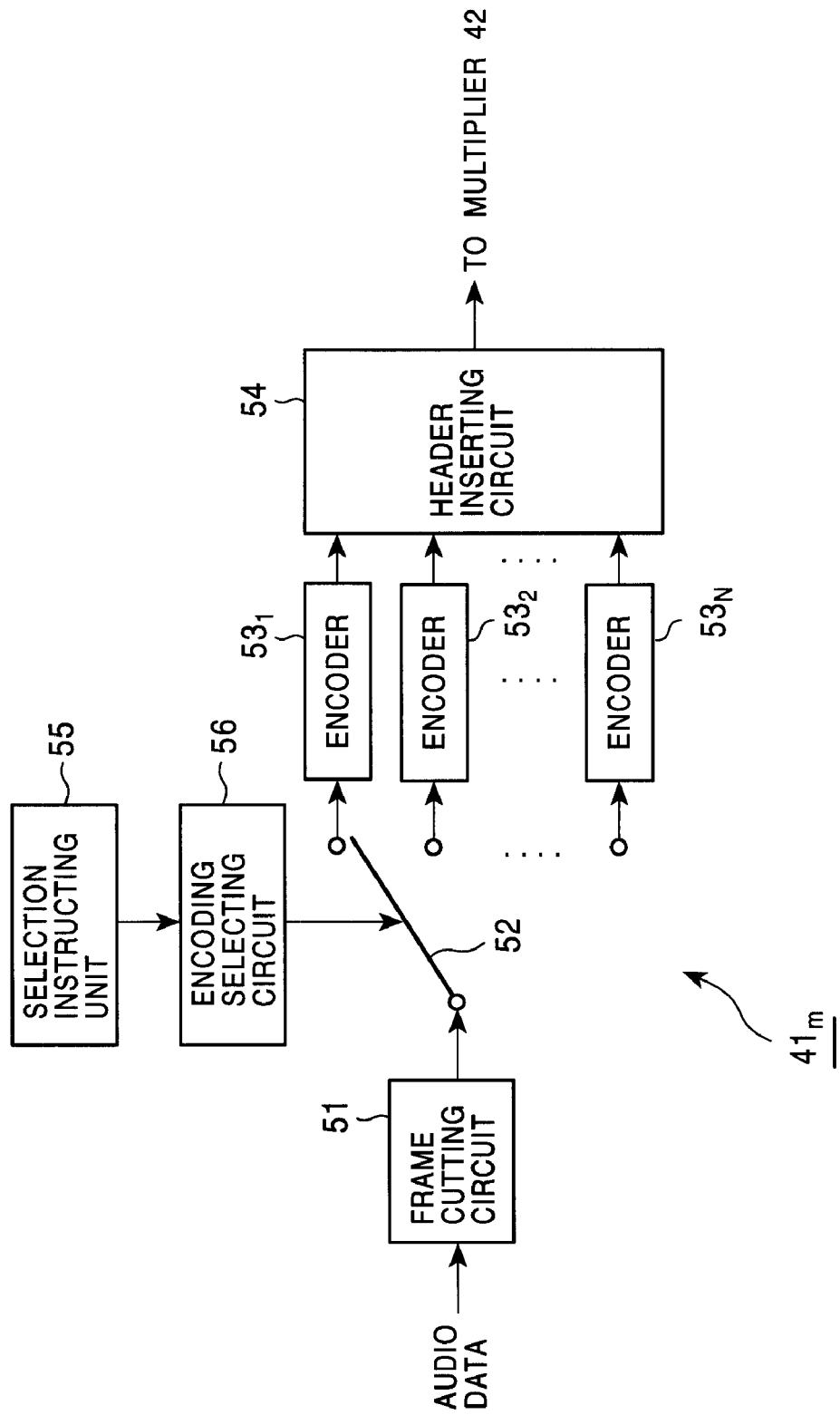
FIG. 5 is a block diagram showing an exemplified construction of a coding unit $41_m$ in FIG. 4.

FIG. 5 shows an exemplified construction of the coding unit $41_m$ in FIG. 4.

A frame cutting circuit 51 cuts the audio signal (audio data) from the audio signal input circuit 31 in units of frame having a predetermined length (e.g., a length suitable for coding made by encoders $53_1$ to $53_N$, or a length suitable for packet (network packet) transmission via the network 2), and then supplies resulting frames to a switch 52. The switch 52 selects one of the encoders $53_1$ to $53_N$ under control of an encoding selecting circuit 56. Accordingly, each frame outputted from the frame cutting circuit 51 is supplied to one of the encoders $53_1$ to $53_N$ through the switch 52.

The encoders $53_1$ to $53_N$ (N is two or more) are constructed to encode the audio signal with different coding methods from each other (for example, linear PCM (Pulse Code Modulation), ADPCM (Adaptive Differential PCM), layers 1, 2, 3 of MPEG (Moving Picture Experts Group), ATRAC (Adaptive Transform Acoustic Coding), ATRAC 2, and HVXC (Harmonic Vector Excitation Coding)). Stated otherwise, in the embodiment, the encoders $53_1$ to $53_N$ are prepared by using encoders which perform encoding of the audio signal with various coding methods, including a method which provides a relatively large (high) bit rate of the resulting coded data, but can reproduce an audio signal with relatively good reproducibility, a method which can provides a relatively small (low) bit rate of the resulting coded data, but reproduces an audio signal with relatively poor reproducibility, a method which requires a larger amount of computation for decoding (such a method usually also requires a larger amount of computation for coding), a method which requires a not so large amount of computation for decoding, and a method particularly suitable for coding a voice (human voice).

One example of the coding method, which provides a relatively many bit rate of the resulting coded data, is the linear PCM (the coded data resulted with this coding method is the same as that obtained by outputting a digital audio signal after A/D conversion as it is). Example of the coding method, which provides a relatively less bit rate of the resulting coded data (i.e., which provides a high compression rate), are MPEG layer 3 and ATRAC 2. One example of the coding method, which requires a not so large amount of computation for decoding, is ATRAC. Further, examples of the coding method suitable for a voice are HVXC and a method utilizing a linear estimation factor. Incidentally, HVXC is one of the methods previously proposed by the assignee of this application, and is disclosed in detail in, e.g., Japanese Unexamined Patent Publication No. 9-127989 (corresponding to U.S. Pat. No. 5,848,387).

It is here assumed that even in the case of the encoders all employing, e.g., ATRAC 2 only, if bit rates are different from each other, this means the use of "different coding methods". In one example, therefore, all the encoders $53_1$ to $53_N$ perform encoding with ATRAC 2, while data rates of coded data outputted from the encoders are 64 Kbps, 32 Kbps, 24 Kbps, . . . , respectively.

A selection instructing unit 55 decides appropriate one from a plurality of coding methods corresponding to the encoders $53_1$ to $53_N$, as described later, and then instructs the encoding selecting circuit 56 to select the decided coding method. In response to the instruction, the encoding selecting circuit 56 controls the switch 52 so as to select the encoder which performs encoding with the instructed coding method. Accordingly, the frame outputted from the frame cutting circuit 51 is supplied to selected one of the encoders $53_1$ to $53_N$ (referred to as the selected encoder hereinafter) through the switch 52.

In the selected one of the encoders $53_1$ to $53_N$, the frame supplied thereto is encoded with the predetermined coding method (referred to as the selected coding method hereinafter because it is executed in the selected encoder). Coded data resulted from encoding made in the selected encoder is supplied to the header inserting circuit 54 where an ID (Identification, i.e., coding method information) representing the selected coding method is added to the coded data.

Thus, in the illustrated embodiment, the audio signal is encoded with one of a number N of coding methods. Also, as described later, the switch 52 may be changed over midway a sequence of continued encoding of the audio signal. In this case, one portion of the audio signal is encoded with one coding method and the other part of the audio signal is encoded with another coding method. Taking into account such a case, the header inserting circuit 54 adds, to the coded data of each frame, an ID indicating the coding method selected to encode the frame, i.e., information indicating with which one of the coding methods each frame of the audio signal has been encoded.

For example, the ID can be given by assigning unique numerals to the encoders $53_1$ to $53_N$, respectively, and expressing the numerals in corresponding byte strings. It is to be noted that the type of ID employed requires to be decided (agreed for a consensus) in advance between both sides of the server 1 and the client terminal 3.

The coded data added with the ID in the header inserting circuit 54 is supplied to the multiplexer 42 (FIG. 4). In the header inserting circuit 54, the ID may be added to only the frame immediately after change of the coding method, for example, instead of being added in units of frame.

Figure 6:
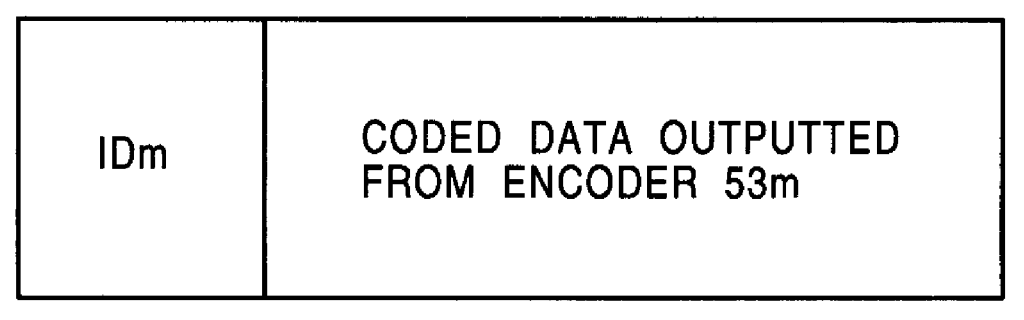

FIG. 6 shows a format of data outputted from the header inserting circuit 54.

As shown in FIG. 6, the coded data is outputted from the encoder $53_m$ in such a state that an $ID_m$ as the ID indicating the coding method executed in the encoder $53_m$ is inserted in, e.g., a header in the header inserting circuit 54.

Figure 7:
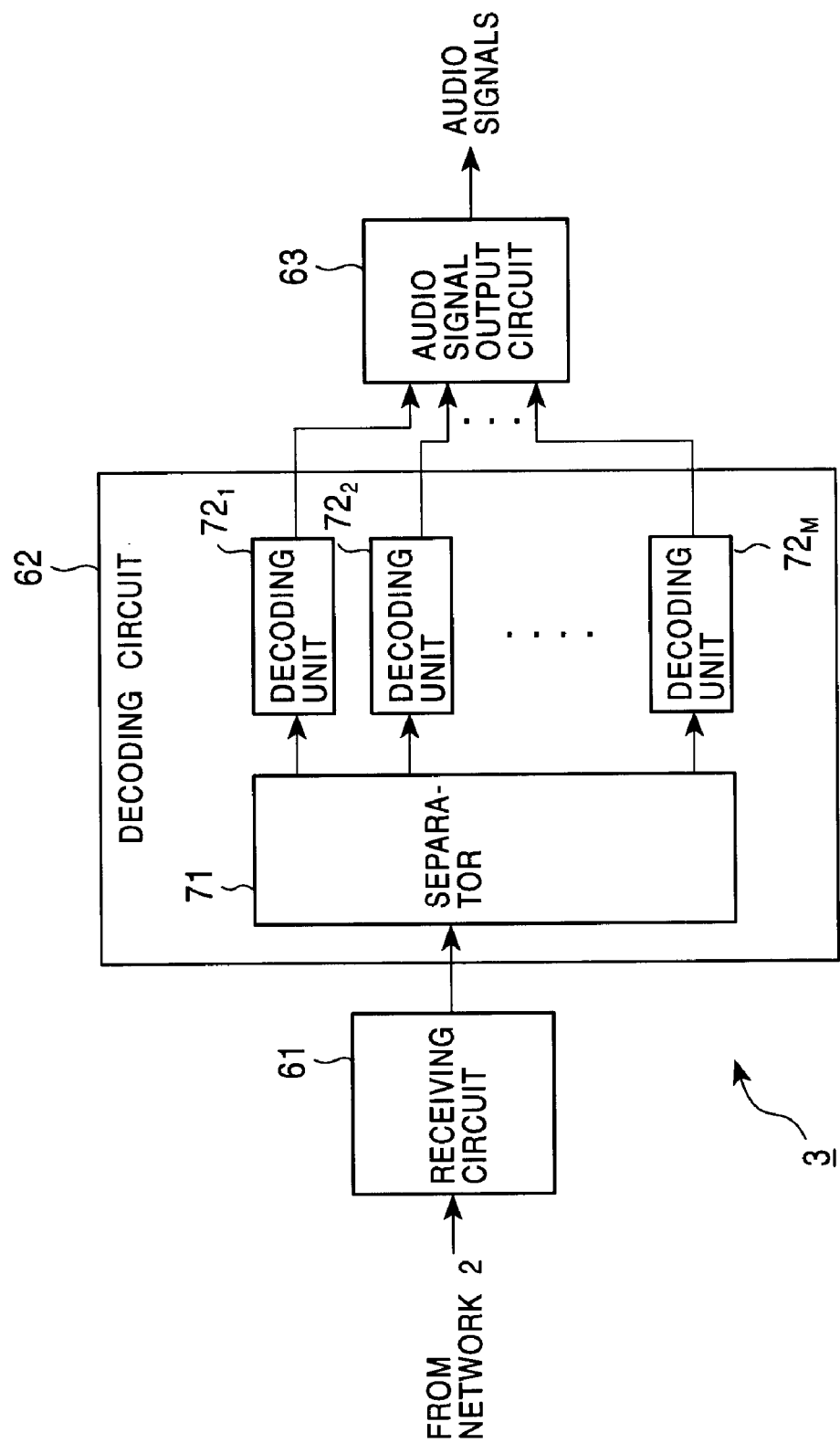
FIG. 7 is a block diagram showing an exemplified functional construction of the client terminal 3 in FIG. 3.

FIG. 7 shows an exemplified functional construction of the client terminal 3 in FIG. 3. The illustrated construction is basically realized upon the CPU 22 executing the application programs stored in the external storage 26.

The coded bit stream (multiplexed data) transmitted from the server 1 via the network 2 is supplied to a receiving circuit 61. After receiving the coded bit stream, the receiving circuit 61 performs format conversion on the received bit stream corresponding to the format conversion made in the transmitting circuit 33 in FIG. 4, and then supplies resulting data to a decoding circuit 62 for decoding thereof.

The decoding circuit 62 comprises a separator 71 and a number M of decoding units $72_1$ to $72_M$. While the number of decoding units $72_1$ to $72_M$ constituting the decoding circuit 62 is set here to be the same as the number of coding units $41_1$ to $41_M$ constituting the coding circuit 32 in FIG. 4, it is not always needed that both the numbers are identical to each other. If the number of decoding units is less than the number of coding units, the audio signal of some one or more channels (parts) is neither decoded nor reproduced in the client terminal 3.

The multiplexed data outputted from the receiving circuit 61 is supplied to the separator 71. The separator 71 separates the multiplexed data into the coded data of respective channels. The coded data of respective channels are each supplied to corresponding one of the decoding units $72_1$ to $72_M$.

The decoding unit $72_m$ decodes the coded data from the separator 71 into the original digital audio signal which is supplied to an audio signal output circuit 63. The audio signal output circuit 63 performs D/A-conversion of the audio signals supplied respectively from the decoding units $72_1$ to $72_M$, and outputs resulting audio signals after mixing if required. The audio signals outputted from the audio signal output circuit 63 are then outputted from, e.g., a speaker constituting the output device 25 (FIG. 3).

Figure 8:
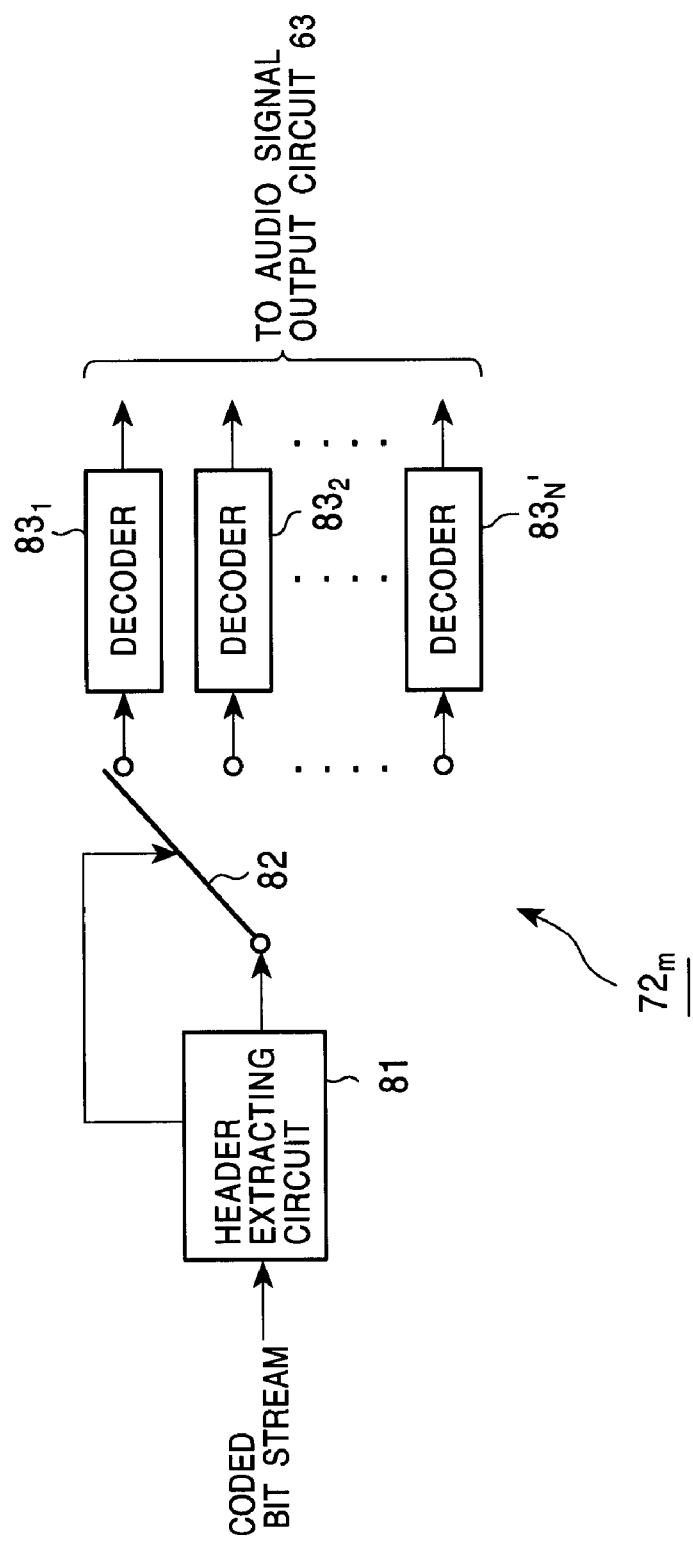
FIG. 8 is a block diagram showing an exemplified construction of a decoding unit $72_m$ in FIG. 7.

FIG. 8 shows an exemplified construction of the decoding unit $72_m$ in FIG. 7.

The coded data from the separator 71 is supplied to a header extracting circuit 81. The header extracting circuit 81 extracts the ID added to the coded data, and recognizes the decoding method for the coded data based on the extracted ID. The ID represents the coding method executed on the coded data as mentioned above, and the decoding method for the coded data can be known if the coding method is identified. In other words, based on the ID added to the coded data, the decoding method for the coded data is recognized in the header extracting circuit 81. Furthermore, based on the recognized result of the decoding method, the header extracting circuit 81 controls a switch 82 to select one of decoders $83_1$ to $83_{N'}$. The header extracting circuit 81 then supplies the coded data, deprived of the associated ID, to one of the decoders $83_1$ to $83_{N'}$ (referred to as a selected decoder hereinafter) selected by the switch 82.

The decoders $83_1$ to $83_{N'}$ (N' is one or more) are constructed to decode the coded data with different decoding methods from each other (basically with decoding methods corresponding to the coding methods executed in the encoders $53_1$ to $53_N$ of the server 1, respectively). The selected decoder decodes the coded data, which is supplied to it from the header extracting circuit 81 through the switch 82, into the original audio signal. The decoded audio signal is supplied to the audio signal output circuit 63 (FIG. 7).

Next, the transmitting process executed by the server 1 will be described with reference to a flowchart of FIG. 9.

Figure 9:
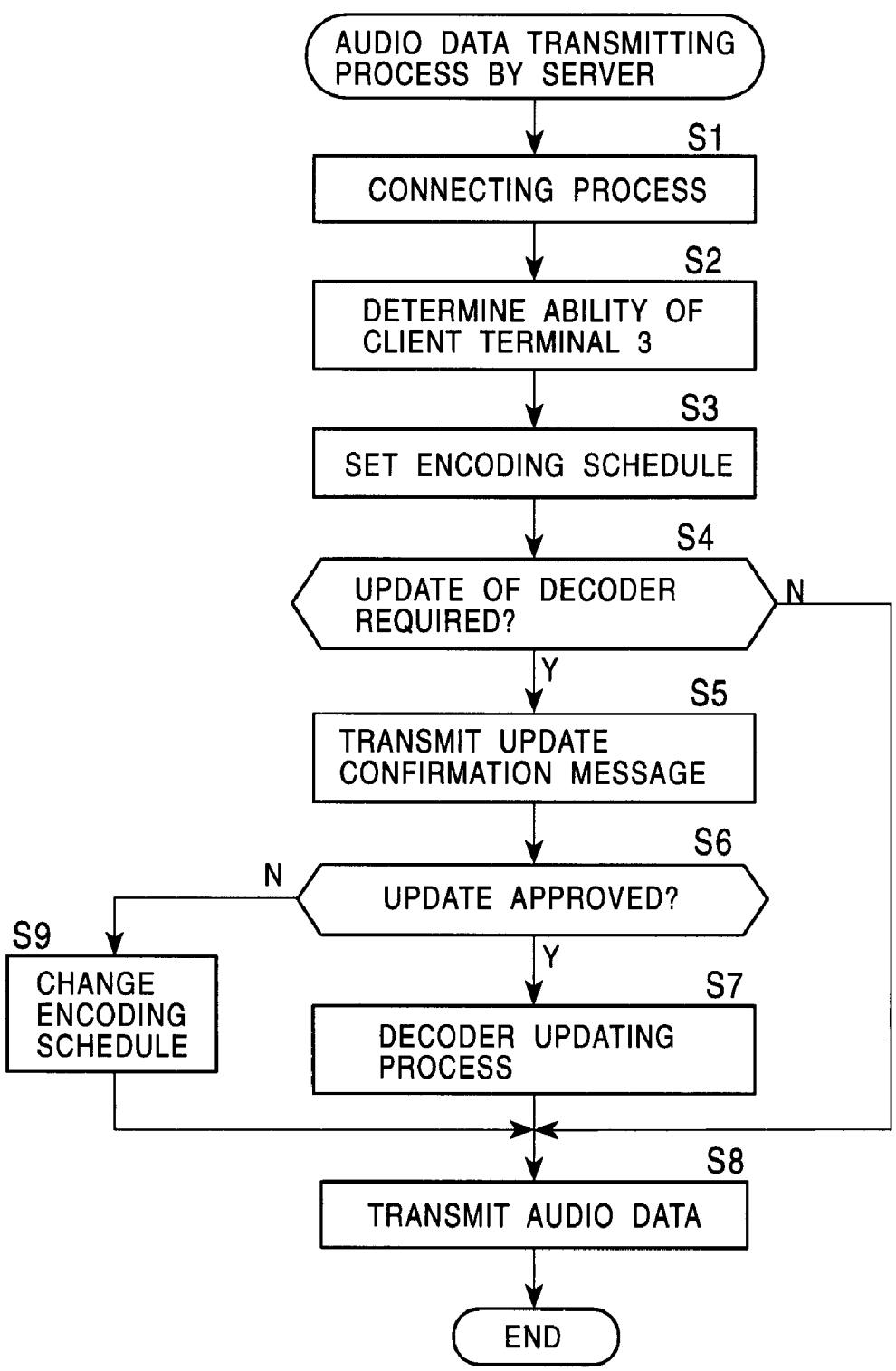
FIG. 9 is a flowchart for explaining a transmitting process executed by the server 1.

When a connection request for receiving supply of audio signals via the network 2 is transmitted to the server 1 from the client terminal 3, the server 1 receives the connection request and executes the transmitting process in accordance with the flowchart of FIG. 9.

More specifically, the CPU 12 of the server 1 first executes a connecting process necessary for communication between the server 1 and the client terminal 3 in step S1. A communication link between the server 1 and the client terminal 3 is thereby established. Note that the server 1 is constructed so as to confirm, for example, whether the number of client terminals connected to the network at present is within a processing ability of the server 1 itself, or whether a large load possibly impeding stable communication is not applied, and to establish a communication link between the server 1 and the client terminal 3 if the client terminal 3 is in a condition capable of executing the processing without problems, or to reject the connection between the server 1 and the client terminal 3 if not so.

Thereafter, in step S2, the CPU 12 determines the processing ability of the client terminal 3 for which the communication link has been established. Here, the processing ability of the client terminal 3 is determined, by way of example, as shown in FIGS. 10A to 10C.

Figure 10A:
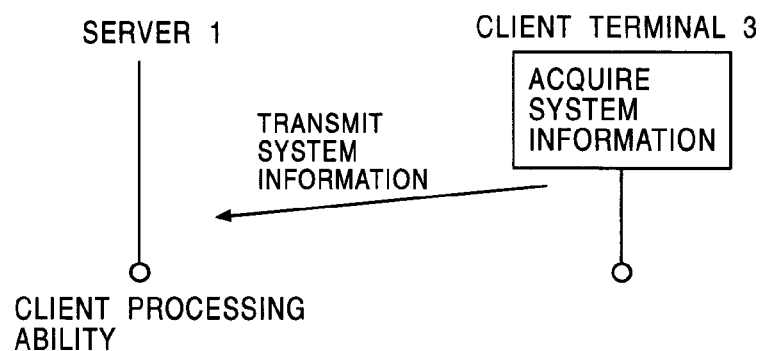
FIGS. 10A to 10C are diagrams each for explaining a process executed in step S2 of FIG. 9.

In one example shown in FIG. 10A, the client terminal 3 is constructed to transmit system information, such as the ability of the CPU 22 (including the CPU name and a clock), the memory capacity (the capacity of the RAM 23), the OS, and the remaining capacity of a hard disk (the remaining capacity of the external storage 26), after the establishment of the communication link. Based on the system information transmitted from the client terminal 3 on a voluntary base, the CPU 12 determines the processing ability of the client terminal 3.

Figure 10B:
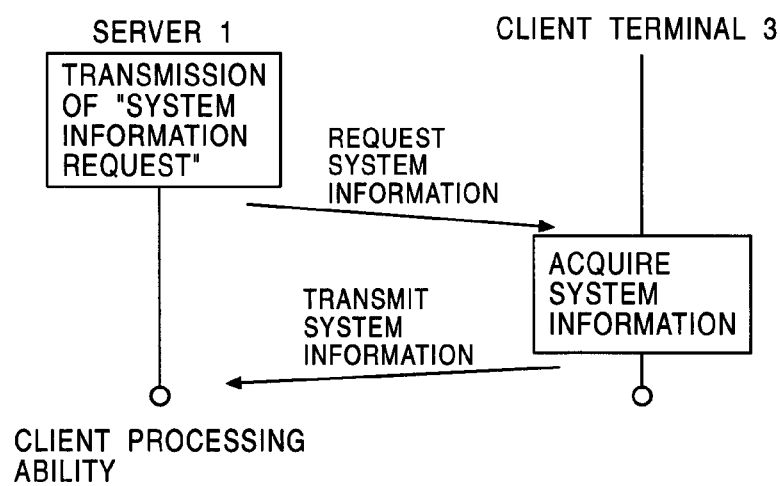

In another example shown in FIG. 10B, after the establishment of the communication link between the server 1 and the client terminal 3, the CPU 12 controls the communicating device 17 to transmit a system information request for requesting transmission of system information of the client terminal 3 to the client terminal 3 via the network 2. The system information request is received by the communicating device 27 of the client terminal 3 and is supplied to the CPU 22. Upon receiving the system information request, the CPU 22 controls the communicating device 27 such that the system information of the client terminal 3 is transmitted to the server 1 via the network 2, as shown in FIG. 10B. In the server 1, the system information thus transmitted thereto is received by the communicating device 17 and then supplied to the CPU 12. The CPU 12 recognizes the processing ability of the client terminal 3 based on the received system information.

Figure 10C:
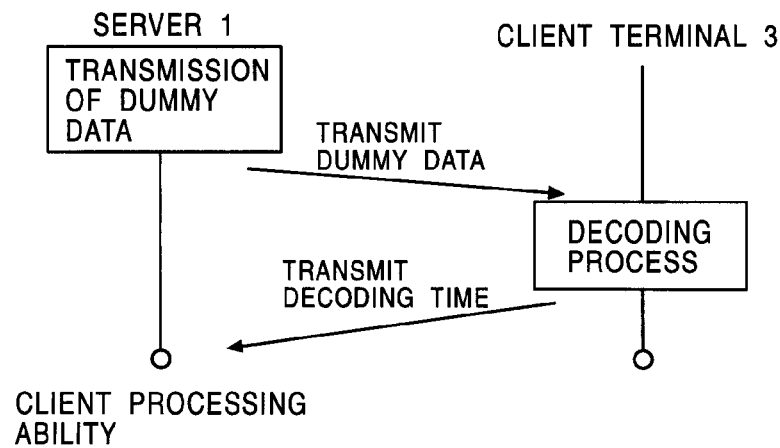

In still another example shown in FIG. 10C, after the establishment of the communication link between the server 1 and the client terminal 3, the CPU 12 controls the communicating device 17 to transmit, as dummy data, coded data of one frame, for example, which has been encoded by any one of the encoders $53_1$ to $53_N$, to the client terminal 3 via the network 2. The dummy data can be prepared by using, e.g., a part of audio signals requested from the client terminal 3 at the time of requesting a connection request. Alternatively, coded data for use as the dummy data may be prepared beforehand for the specific purpose of recognizing the processing ability of the client terminal 3.

The dummy data transmitted from the server 1 is received by the client terminal 3 and is decoded by one of the decoders $83_1$ to $83_{N'}$ of the decoding unit $72_m$. Here, the dummy data is also added with an ID. In the decoding unit $72_m$ shown in FIG. 8, the ID added to the dummy data is extracted in the header extracting circuit 81 and the decoding method for the dummy data is recognized based on the extracted ID. The header extracting circuit 81 controls the switch 82 to select the decoder for decoding the dummy data with the recognized decoding method, whereupon the dummy data is supplied to selected one of the decoders $83_1$ to $83_{N'}$ for decoding therein.

The CPU 22 of the client terminal 3 measures a decoding time required for the selected decoder to decode the dummy data, and then transmits the measured decoding time to the server 1, as shown in FIG. 10C. The CPU 12 of the server 1 recognizes the processing ability of the client terminal 3 based on the decoding time.

In any case of FIGS. 10A to 10C, after recognizing the processing ability of the client terminal 3, the CPU 12 determines whether the processing ability of the client terminal 3 is sufficient to decode and reproduce audio signals in real time. More specifically, where the processing ability of the client terminal 3 is recognized as described with reference to FIGS. 10A and 10B, a resource table describing system resources necessary for decoding in real time respective coded data that have been encoded by the encoders $53_1$ to $53_N$ is stored in the external storage 16, for example. By referring to the resource table, the CPU 12 determines whether the processing ability of the client terminal 3 is sufficient to decode and reproduce in real time the coded data that is resulted from encoding audio signals with the predetermined coding method.

Also, where the processing ability of the client terminal 3 is recognized as described with reference to FIG. 10C, the CPU 12 determines whether the processing ability of the client terminal 3 is sufficient to decode and reproduce the coded data in real time, based on whether the decoding time of the coded data in the client terminal 3 is shorter than a time required for reproducing audio signals by decoding of the coded data. In other words, if the decoding time is shorter than the reproducing time, the processing ability of the client terminal 3 is determined to be sufficient. If not so, the processing ability of the client terminal 3 is determined to be not sufficient.

In the case of recognizing the processing ability of the client terminal 3 by the method described with reference to FIG. 10C, it is needed to employ the dummy data that can be decoded by any one of the decoders $83_1$ to $83_{N'}$ installed in the client terminal 3. As to what kind of coded data can be decoded in the client terminal 3, it is possible to make the server 1 recognize it, for example, by transmitting an ID corresponding to the usable decoding method from the client terminal 3 to the server 1 in accordance with a predetermined method. Alternatively, the server 1 may transmit respective dummy data encoded by the encoders $53_1$ to $53_N$ in succession, and the client terminal 3 may decode only those of the dummy data transmitted from the server 1 which can be decoded, and then return the decoding time of each decoding process to the server 1.

Also, in the method shown in FIG. 10C, the amount of processing to be made for decoding may change depending on the contents of the dummy data (e.g., depending on how the magnitude of original audio signals varies) in some decoders (selected decoders) used for decoding the dummy data. In such a case, the type of data that requires a maximum or minimum amount of processing, for example, can be used as the dummy data.

Further, while in the method shown in FIG. 10C the decoding time is transmitted from the client terminal 3 to the server 1 and whether the processing ability of the client terminal 3 is sufficient is determined in the server 1 based on the transmitted decoding time, such determination may be made in the client terminal 3 based on the decoding time, system resources thereof, etc., and a result of the determination may be transmitted to the server 1.

Additionally, in the method shown in FIG. 10C, since the dummy data is actually decoded in the client terminal 3, there is an advantage that when a part of system resources is employed for any other process, effective power (resources) which are actually available to decode and reproduce the coded data except the occupied part can be recognized.

Returning to FIG. 9, after recognizing the processing ability of the client terminal 3, the CPU 12 of the server 1 goes to step S3 to set an encoding schedule with which the coded data can be decoded and reproduced in real time within the processing ability of the client terminal 3. In other words, the selection instructing unit 55 embodying one function of the CPU 12 decides which one of the coding methods executed in the encoders $53_1$ to $53_N$ is used to decode the corresponding part of the audio signals requested from the client terminal 3.

Concretely, one of the coding methods, which is adaptable for a decoding method requiring greater power within the processing ability of the client terminal 3 and outputs the coded data at a higher data rate within the range not exceeding the transmission rate of the network 2, is set as the decoding method to decode the audio signal. By so selecting the decoding method, the audio signal can be reproduced in the client terminal 3 with good sound quality.

Also, when several coding methods are available, the coding method to be executed is set depending on the audio signals requested from the client terminal 3. In the case where such several coding methods include one suitable for a voice (e.g., HVXC and a method utilizing a linear estimation factor) and another suitable for instrument sounds (e.g., ATRAC), for example, when the audio signal requested from the client terminal 3 has one portion in which a level of the voice is relatively high and the other portion in which a level of the instrument sounds is relatively high, the coding method suitable for the voice is selected for one portion in which a level of the voice is relatively high, and the coding method suitable for the instrument sounds is selected for the other portion in which a level of the instrument sounds is relatively high.

In the server 1, therefore, a time-series audio signal is not always encoded with certain one coding method in the entirety thereof. In some cases, one portion of the audio signal is decoded with one coding method, while the other portion of the audio signal is decoded with another different coding method. A schedule of the coding methods executed for encoding a time-series audio signal is set in step S3, and the schedule is called the encoding schedule.

The encoding schedule can also be set in advance so as to be adapted for an audio signal by an administrative operator of the server 1 (or a provider of the audio signal) manipulating the input device 14. In this case, if it is difficult to decode and reproduce the audio signal in real time with the coding methods of the preset encoding schedule from the standpoints of the processing ability of the client terminal 3 and the transmission rate of the network 2, the coding method which brings about such a difficulty is changed in step S3 to another which can decode and reproduce the audio signal in real time.

A manner of recognizing the transmission rate of the network 2 will be described later.

After setting of the encoding schedule, the CPU 12 goes to step S4 to determine whether update (including both version-up of existing decoders and installation of new decoders) of the decoders of the client terminal 3 is required. Specifically, even when an audio signal is encoded in accordance with the encoding schedule set in step S3 and resulting coded data is transmitted to the client terminal 3, the audio signal cannot be reproduced if the client terminal 3 has no decoders capable of decoding the coded data. Therefore, the CPU 12 first recognizes the decoders $83_1$ to $83_{N'}$ installed in the client terminal 3, and then determines whether any of the coded data resulted with the coding methods set in the encoding schedule cannot be decoded in the client terminal 3.

To that end, for example, the CPU 12 of the server 1 can recognize the decoders $83_1$ to $83_{N'}$ by receiving, from the client terminal 3, respective IDs for the coding methods corresponding to the decoding methods executed in the decoders $83_1$ to $83_{N'}$ installed in the client terminal 3. As an alternative, the CPU 12 of the server 1 can also recognize the decoders $83_1$ to $83_{N'}$ installed in the client terminal 3 by successively transmitting dummy data resulted from being encoded by the encoders $53_1$ to $53_N$, and then rendering the client terminal 3 to transmit back results of decoding of the dummy data made in the client terminal 3.

Incidentally, data transfer for rendering the server 1 to recognize the decoders $83_1$ to $83_{N'}$ installed in the client terminal 3 may be performed, for example, in step S2 along with data transfer for recognizing the processing ability of the client terminal 3, or may be performed immediately before the processing of step S4.

If any of the coded data resulted with the coding methods set in the encoding schedule cannot be decoded in the client terminal 3, it is determined in step S4 that update of at least one decoder is required. In this case, the CPU 12 goes from step S4 to S5 where it controls the communicating device 17 to transmit, to the client terminal 3, a confirmation message for confirming whether update of the decoder is approved.

The confirmation message is received by the communicating device 27 of the client terminal 3 and displayed on the output device 25. Looking at the confirmation message, the user at the client terminal 3 manipulates the input device 24 and enters a message indicating whether the update is to be made or not (referred to as an update approval/disapproval message hereinafter). The update approval/disapproval message is transmitted from the communicating device 27 to the server 1 and then received by the communicating device 17 of the server 1. Alternatively, it is also possible to prepare setting to make a decision about approval or disapproval of the update beforehand in the client terminal 3, and to transmit the update approval/disapproval message from the client terminal 3 based on the setting.

The update approval/disapproval message received by the communicating device 17 is supplied to the CPU 12. Based on the update approval/disapproval message, the CPU 12 determines in step S6. whether the decoder is to be updated. If the update approval/disapproval message indicates approval of the update, the CPU 12 determines in step S6 that the decoder is to be updated, followed by going to step S7 to execute a decoder updating process.

More specifically, the external storage 16 stores a program module (decoder library) for rendering the computer to function as a decoder to decode the coded data outputted from each of the encoders $53_1$ to $53_N$. The CPU 12 reads out of the external storage 16 the decoder library for rendering the client terminal 3 to function as a decoder to decode one of the coded data resulted with the coding methods set in the encoding schedule which cannot be decoded in the client terminal 3. The external storage 16 stores decoder libraries operating on various CPUs and OSes, and the CPU 12 reads out of the external storage 16 the decoder library capable of operating in the client terminal 3 based on the processing ability thereof recognized in step S2.

Then, the CPU 12 transmits, to the client terminal 3, the decoder library read out of the external storage 16 along with an install program for loading (installing) the decoder library in the client terminal 3. After the client terminal 3 receives both the decoder library and the install program, the install program is started up and executed, whereby the decoder library is installed in the client terminal 3.

When there are several ones of the coded data resulted with the coding methods set in the encoding schedule which cannot be decoded in the client terminal 3, the decoder libraries for rendering the client terminal 3 to function as decoders to decode the several coded data respectively are transmitted in step S7 and are installed in the client terminal 3.

Additionally, the decoder library may be a dynamic link library loaded only when needed. In the case of the decoder library being loaded as a dynamic link library, however, it is required that the OS operating on the client terminal 3 can deal with the dynamic link library.

Upon completion of the decoder updating process in step S7, the CPU 12 goes to step S8 where the audio signals requested from the client terminal 3 are encoded into coded data and then transmitted via the network 2 in accordance with the encoding schedule.

More specifically, the selection instructing unit 55 in the coding unit $53_m$ shown in FIG. 5 gives an instruction to the encoding selecting circuit 56 in accordance with the encoding schedule, whereupon the switch 52 selects one of the encoders $53_1$ to $53_N$. Then, the audio signal inputted to the frame cutting circuit 51 and cut in units of frame is supplied to the encoder selected by the switch 52 (the selected encoder) and encoded into coded data. The coded data is applied to the header inserting circuit 54 in which an ID is added to the coded data, followed by being supplied to the multiplexer 42. After that, the coded data is transmitted to the client terminal 3 as described above.

More concretely, it is here assumed, for example, that a time-series audio signal from the time $t_0$ to $t_6$ ($t_0 < t_6$, shown in FIG. 11A, is requested from the client terminal 3, and an encoding schedule shown in FIG. 11B is set. In FIG. 11B, $E_1$ to $E_4$ represent the coding methods executed in the encoders $53_1$ to $53_4$, respectively.

In the encoding schedule of FIG. 11B, the coding methods $E_1$, $E_2$, $E_3$, $E_4$, $E_2$ and $E_3$ are designated for respective periods of $t_0$ to $t_1$, $t_1$ to $t_2$, $t_2$ to $t_3$, $t_3$ to $t_4$, $t_4$ to $t_5$, and $t_5$ to $t_6$, ($t_0 < t_1 < t_2 < t_3 < t_4 < t_5 < t_6$). In the periods of $t_0$ to $t_1$, $t_1$ to $t_2$, $t_2$ to $t_3$, $t_3$ to $t_4$, $t_4$ to $t_5$, and $t_5$ to $t_6$, therefore, the switch 52 selects the encoders $53_1$, $53_2$, $53_3$, $53_4$, $53_2$ and $53_3$, respectively. Then, portions of the audio signal shown in FIG. 11A corresponding to the periods of $t_0$ to $t_1$, $t_1$ to $t_2$, $t_2$ to $t_3$, $t_3$ to $t_4$, $t_4$ to $t_5$, and $t_5$ to $t_6$ are encoded by the encoders $53_1$, $53_2$, $53_3$, $53_4$, $53_2$ and $53_3$, respectively, followed by being transmitted to the client terminal 3.

Returning to FIG. 9, when transmission of all the coded data resulted from encoding the audio signals requested from the client terminal 3 is completed in step S8, the CPU 12 cuts off the connection between the server 1 and the client terminal 3, thus ending the transmitting process.

On other hand, if the update approval/disapproval message indicates disapproval of the update, the CPU 12 determines in step S6 that the decoder is not to be updated, followed by going to step S9 to execute change of the encoding schedule.

To that end, based on the processing ability of the client terminal 3 having been already recognized and the decoders installed in the client terminal 3, the CPU 12 recognizes the coding method for which resulting coded data can be decoded in the client terminal 3 in real time. The CPU 12 then recognizes one or more of the coding methods set in the encoding schedule, for which resulting coded data cannot be decoded in the client terminal 3 in real time, and changes them to the coding method for which resulting coded data can be decoded in the client terminal 3 in real time.

More concretely, it is here assumed, for example, that the encoding schedule designates respectively the coding methods $E_1$, $E_2$, $E_3$, $E_4$, $E_2$ and $E_3$ for the periods of $t_0$ to $t_1$, $t_1$ to $t_2$, $t_2$ to $t_3$, $t_3$ to $t_4$, $t_4$ to $t_5$, and $t_5$ to $t_6$, as shown in FIG. 11B. In such a case, when the coding methods for which resulting coded data can be decoded in the client terminal 3 in real time are $E_1$, $E_3$ and $E_4$, and the client terminal 3 include no decoder for decoding the coded data resulted with the coding method $E_2$, a portion of the encoding schedule, in which the coding method $E_2$ is designated, is changed to any of the coding method $E_1$, $E_3$ and $E_4$ for which resulting coded data can be decoded in the client terminal 3 in real time, as shown in FIG. 11C. In FIG. 11C, by way of example, the coding method for the audio signal is changed to the coding method $E_1$ in each of the periods of $t_1$ to $t_2$ and $t_4$ to $t_5$ where the coding method $E_2$ is designated.

After the encoding schedule has been changed in step S9, the CPU 12 goes to step S8 where the audio signals requested from the client terminal 3 are encoded into coded data in accordance with the changed encoding schedule, and is transmitted to the client terminal 3 via the network 2. When transmission of all the coded data of the audio signals is completed, the CPU 12 cuts off the connection between the server 1 and the client terminal 3, thus ending the transmitting process.

In addition to the case where the user at the client terminal 3 does not want to update the decoders, the update approval/disapproval message indicating disapproval of the update is also transmitted from the client terminal 3, for example, in the following cases as well. Thus, when the remaining capacity of the external storage 26 in the client terminal 3 is not sufficient, or when the client terminal 3 is of the portable small-size type and has no rewritable recording medium, the update approval/disapproval message indicating disapproval of the update is transmitted from the client terminal 3.

On the other hand, if there is no one of coded data resulted with the coding methods set in the encoding schedule that cannot be decoded in the client terminal 3, the CPU 12 determines in step S4 that the update of the decoder is not required. In this case, the CPU 12 skips from step S4 to S8 where the audio signals requested from the client terminal 3 are encoded into coded data in accordance with the encoding schedule set in step S3, and is transmitted to the client terminal 3 via the network 2. When transmission of all the coded data of the audio signal is completed, the CPU 12 cuts off the connection between the server 1 and the client terminal 3, thus ending the transmitting process.

Additionally, when the update approval/disapproval message indicating disapproval of the update is transmitted from the client terminal 3, a request for designating the coding method for the audio signal can be transmitted together with the update approval/disapproval message. In this case, the encoding schedule is changed in step S9 in accordance with the request from the client terminal 3.

Also, when the coding method in the encoding schedule is changed in step S9 upon receiving the update approval/disapproval message indicating disapproval of the update from the client terminal 3, it is possible to exclude the coding method before the change of the encoding schedule from being used again when providing the coded data to the client terminal 3 since then. This can be realized by storing the client terminal 3 and the coding method before the change of the encoding schedule in a corresponding manner.

Figure 12:
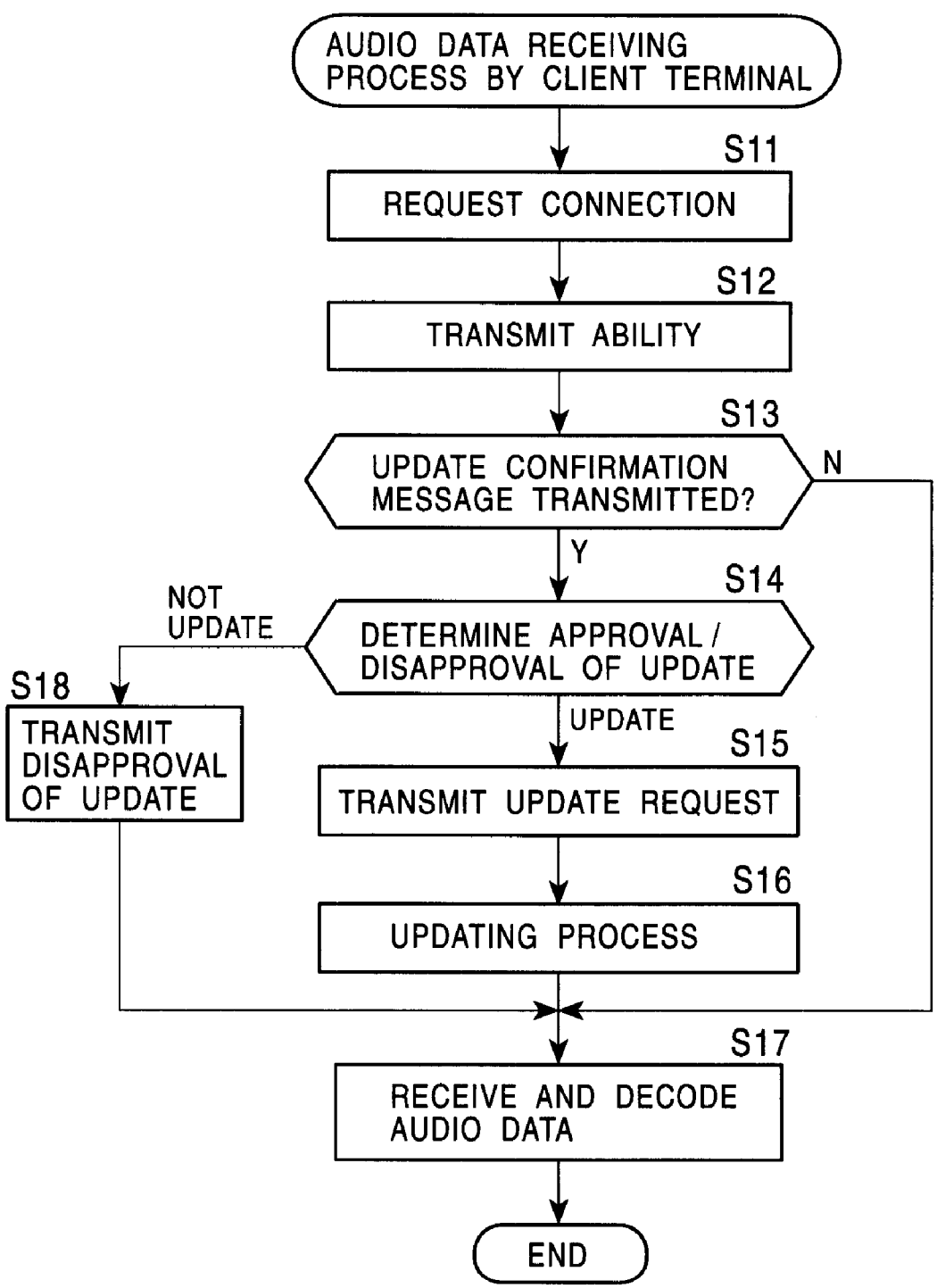
FIG. 12 is a flowchart for explaining a receiving process executed by the client terminal 3.

Next, the receiving process executed by the client terminal 3 will be described with reference to a flowchart of FIG. 12.

When requesting audio signals for the server 1, the user manipulates the input device 24 to issue a request for the audio signals. In this case, the CPU 22 controls the communicating device 27 to transmit a connection request to the server 1 via the network 2 in step S11. In response to the connection request, a communication link between the server 1 and the client terminal 3 is established in step S1 of FIG. 9 on the server 1 side. When the communication link between the server 1 and the client terminal 3 is established, the request for the audio signals is transmitted to the server 1.

Subsequently, in step S12, the CPU 22 of the client terminal 3 transmits the processing ability thereof to the server 1. In the server 1, the processing ability of the client terminal 3 is received and recognized, following which an encoding schedule is planned. If the update of the decoder is required, the server 1 transmits a confirmation message to the client terminal 3, and if not required, the server 1 transmits the coded data resulted from encoding the audio signals, which have been requested from the client terminal 3, to the client terminal 3 in accordance with the encoding schedule.

In the client terminal 3, after transmitting the processing ability thereof, it is determined in step S13 whether a confirmation message has been transmitted to the client terminal 3. If it is determined in step S13 that the confirmation message has been transmitted, the confirmation message is received by the communicating device 27 and is supplied to the CPU 22. Upon receiving the confirmation message, the CPU 22 supplies the confirmation message to the output device 25 and displays it thereon.

Looking at the confirmation message displayed on the output device 25, the user at the client terminal 3 manipulates the input device 24 and enters an update approval/disapproval message indicating whether the update of the decoder is to be made or not. When the input device 24 is manipulated and the update approval/disapproval message is entered, the CPU 22 goes to step S14 to determine whether the update approval/disapproval message requests or rejects the update. If it is determined in step S14 that the update approval/disapproval message indicates request of the update, the CPU 22 goes to step S15 to control the communicating device 27 such that the update approval/disapproval message indicating request (approval) of the update is transmitted to the server 1.

After receiving the update approval/disapproval message, the server 1 transmits both the decoder library and the install program to the client terminal 3 as described above. The client terminal 3 receives them and then executes an updating process in step S16. Stated otherwise, in the client terminal 3, both the decoder library and the install program are received by the communicating device 27, and the install program is executed in the CPU 22, whereby the decoder library is installed in the external storage 26.

After that, in step S17, the client terminal 3 receives the coded data transmitted from the server 1, followed by decoding and reproducing the coded data.

More specifically, in the decoding unit $72_m$ shown in FIG. 8, the header extracting circuit 81 extracts the ID added to the coded data, and recognizes the decoding method for the coded data based on the extracted ID. Further, based on the recognized result of the decoding method, the header extracting circuit 81 controls the switch 82 to select one of decoders $83_1$ to $83_{N'}$ (or one of decoders $83_1$ to $83_{N'}$ and a new decoder corresponding to the decoder library when the decoder library has been installed in the updating process of step S16). The header extracting circuit 81 then supplies the coded data, deprived of the associated ID, to one of the decoders $83_1$ to $83_{N'}$ selected by the switch 82 (i.e., the selected decoder).

The selected decoder decodes the coded data, applied to it through the switch 82, into the original audio signal which is then supplied to the audio signal output circuit 63 (FIG. 7). When all the coded data transmitted from the server 1 is completely decoded and reproduced, the receiving process is ended.

If it is determined in step S14 that the update approval/disapproval message indicates rejection of the update, the CPU 22 goes to step S18 to control the communicating device 27 such that the update approval/disapproval message indicating rejection (disapproval) of the update is transmitted to the server 1.

In the server 1 having received the update approval/disapproval message, as described above, the encoding schedule is changed to present the coding methods each of which can be decoded by any of the decoders $83_1$ to $83_{N'}$ installed in the client terminal 3. Then, the coded data encoded in accordance with the changed encoding schedule is transmitted to the client terminal 3. In the client terminal 3, the CPU 22 goes from step S18 to S7 to receive the coded data for decoding and reproducing the coded data, as described above, following which the receiving process is ended.

On the other hand, if it is determined in step S13 that the confirmation message is not transmitted, this means that the update of the decoders is not required. Accordingly, when the coded data is transmitted from the server 1, the CPU 22 in the client terminal 3 goes to step S17 to receive the coded data for decoding and reproducing the coded data, as described above, following which the receiving process is ended.

When the decoder library is installed in the updating process of step S16, the CPU 22 executes the installed decoder library and constructs a new decoder in addition to the decoders $83_1$ to $83_{N'}$ shown in FIG. 8 (i.e., upon execution of the installed decoder library, the CPU 22 is rendered to function also as a decoder corresponding to the installed decoder library in addition to the decoders $83_1$ to $83_{N'}$. Then, when the header extracting circuit 81 extracts the ID indicating the coding method which provides the coded data to be decoded by the new decoder, the switch 82 is controlled so as to select the new decoder, whereby the coded data, to which that ID has been added, is supplied to the new decoder. As a result, the client terminal 3 is enabled to decode the coded data which cannot be decoded by any of the decoders $83_1$ to $83_{N'}$ which are inherently installed in the client terminal 3.

When the update approval/disapproval message indicating rejection of the update is transmitted in step S18, it is possible to transmit a request for supply of the coded data resulted with a certain coding method (i.e., the coded data which can be decoded by any of the decoders installed in the client terminal 3 itself). In this case, in the server 1, the encoding schedule is changed to include the requested coding method in step S9 of FIG. 9.

As described above, because the server 1 has a plurality of encoders $53_1$ to $53_N$, it is possible to select and provide, for example, the coded data resulted with the coding method optimum for the processing ability of the client terminal 3, or the coded data resulted with the coding method optimum for each of different portions of an audio signal. Also, when there is an allowance in the processing ability of the client terminal 3, the server 1 can select and provide the coded data resulted with the coding method with which the original audio signal is decoded and reproduced with better sound quality, for example. Furthermore, the server 1 can also select and provide, for example, the coded data resulted with the coding method which is requested from the client terminal 3.

In addition, the server 1 recognizes the decoders (decoder libraries) $83_1$ to $83_{N'}$ installed in the client terminal 3, and if the client terminal 3 has not a decoder capable of decoding the coded data to be transmitted to it, that decoder (decoder library) is transmitted from server 1 to the client terminal 3 to be loaded therein. Therefore, the user can receive supply of audio signals through an interface of unified standard without paying particular care to the decoders installed in the client terminal 3 and the coding methods prepared in the server 1 for encoding audio signals. Moreover, because of a decoder necessary for decoding the coded data being installed in a virtually automatic manner, even when a new encoder is added on the server 1 side, the user is not required to install a decoder corresponding to the added encoder by himself or herself. Thus, in such an extreme case that the client terminal 3 has no decoders, the user can receive supply of audio signals because necessary data is installed if the client terminal 3 is only able to access the server 1.

Next, in the network 2 shown in FIG. 1, the transmission rate in transmitting coded data from the server 1 to the client terminal 3 (i.e., the transmission band allocated to the coded data) generally varies due to the amount of traffic, etc. except the case of using a protocol reserving the band used, such as RSVP (Resource Reservation Protocol) specified in RFC (Request For Comments) 2205 (issued by IFTF (Internet Engineering Task Force)), for example. Accordingly, if the transmission rate of the network 2 is reduced down smaller than the data rate of the coded data, transmission of the coded data becomes so late that audio signals cannot be reproduced in real time.

In view of the above problem, the server 1 is designed to detect the transmission rate of the network 2 at the time of transferring data between the server 1 and the client terminal 3, and to change the encoding schedule so as to include the coding method which can provide the coded data having a bit rate not higher than the detected transmission rate of the network 2.

A manner of detecting the transmission rate of the network 2 will now be described below with reference to FIG. 13.

Generally, transmission between the server 1 and the client terminal 3 is performed such that a request for audio signals is issued from the client terminal 3, and in response to the request the server 1 transmits data, or that the server 1 transmits data, and upon receiving the data, the client terminal 3 transmits an acknowledge signal ACK to the server 1.

Figure 13:
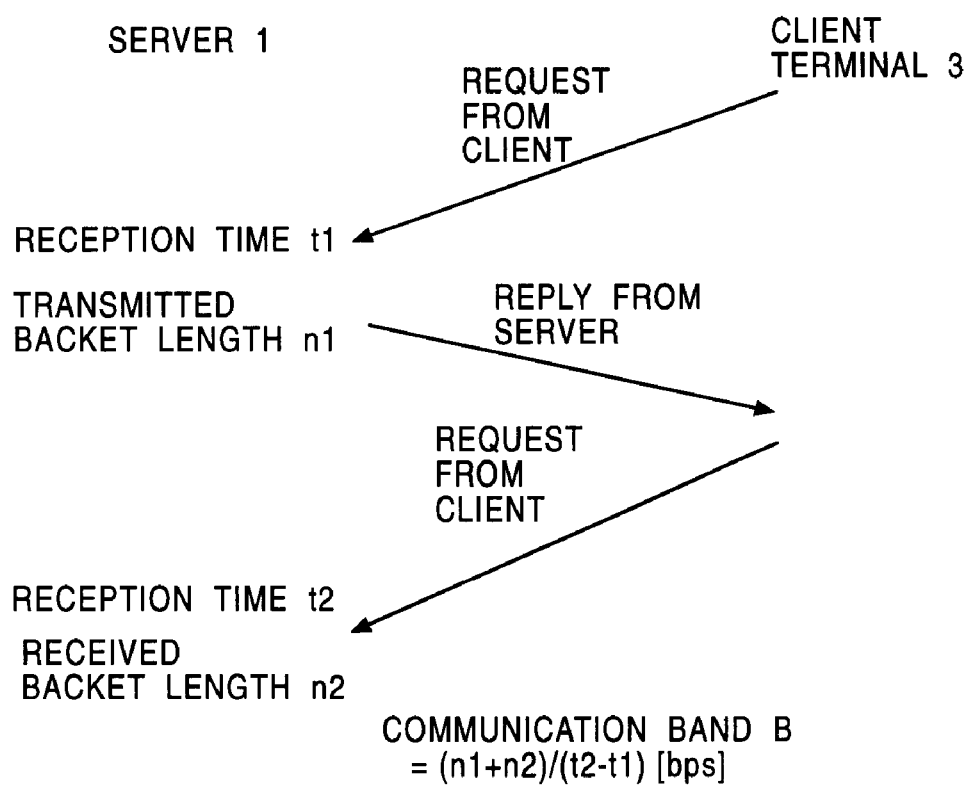
FIG. 13 is a diagram for explaining a manner of determining the transmission rate of a network 2.

With the above communicating process in mind, for example, the CPU 12 of the server memorizes the time t1 when the server 1 receives a request for data from the client terminal 3, as shown in FIG. 13. The CPU 12 also memorizes the bit amount n1 of data transmitted from the server 1 in response to the request. After that, the CPU 12 waits for a next request for data transmitted from the client terminal 3, and then memorizes the time t2 when the server 1 receives the next request for data. Further, the CPU 12 memorizes the bit amount n2 of data transmitted from the client terminal 3 along with the next request. Then, the CPU 12 derives the transmission rate B (bps) of the network 2 from, e.g., the following formula:

$$B=(n1+n2)/(t2-t1) \tag{1}$$

Here, it is to be noted that a period of time from the time when the server 1 receives the request from the client terminal 3 to the time when it transmits the data in response to the request, and a period of time from the time when the client terminal 3 receives the data from the server 1 to the time when it transmits the next request are ignored and assumed to be zero. Although the transmission rate B can be derived more accurately in consideration of those periods of time as well, ignoring those periods of time provides an estimated value of the transmission rate B which is relatively lower by an amount corresponding to those periods of time, and hence the bit rate of the coded data is given with some margin. (In other words, since the actual transmission rate is larger than the transmission rate B derived from the above formula (1), transmission of the coded data can be avoided from becoming too late even if the bit rate of the coded data exceeds the transmission rate B within the range of the margin.)

The server 1 (the CPU 12 thereof) is designed to detect the transmission rate, as described, prior to transmitting audio signals, and to plan the encoding schedule. Further, the server 1 is designed to detect the transmission rate and to change the encoding schedule even during transmission of audio signals (coded data resulted from encoding of the audio signals in the illustrated embodiment) in step S8 of FIG. 9.

Figure 14:
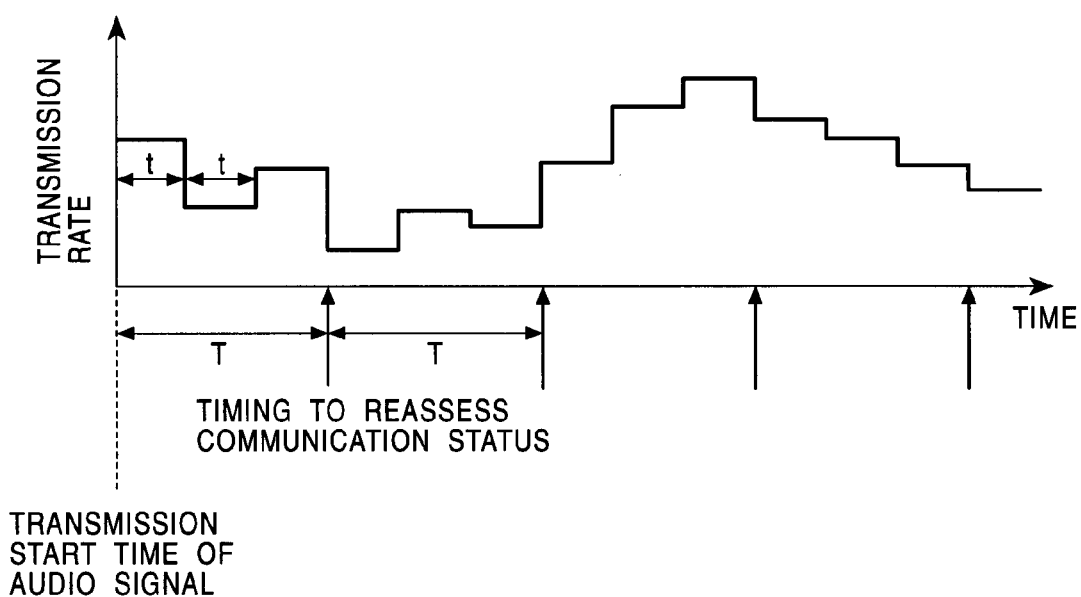
FIG. 14 is a chart for explaining the timing to change the encoding schedule.
Figure 15:
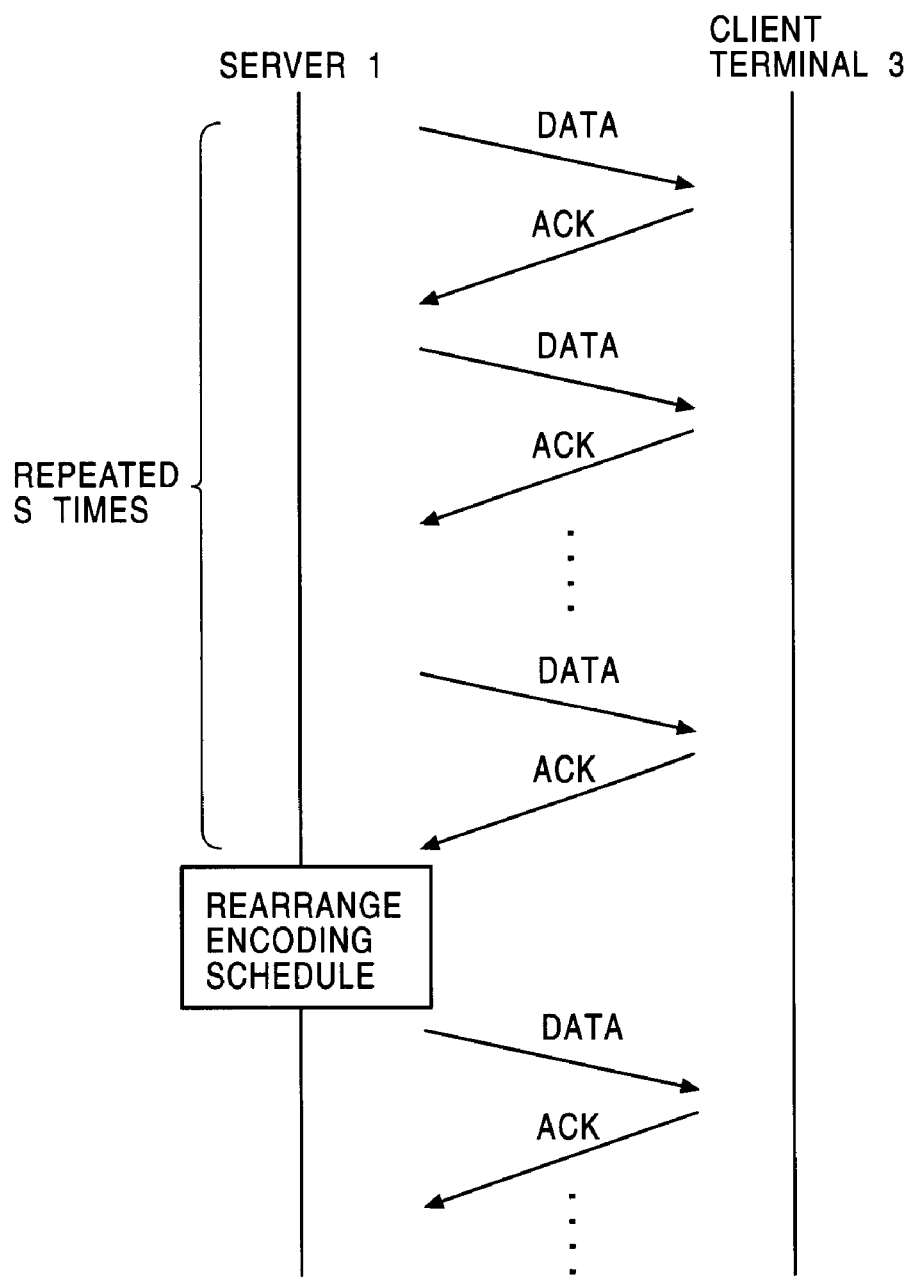
FIG. 15 is a chart for explaining the timing to change the encoding schedule.

More specifically, as shown in FIG. 14, since the transmission rate usually varies with time, the server 1 derives the transmission rate B in accordance with the above formula (1) for each predetermined period of time t (the period of time t is assumed to be longer than the period of time from the time when the server 1 transmits an audio signal to the time when the client terminal 3 having received the audio signal transmits an acknowledge signal ACK). Then, the server 1 changes the encoding schedule for each period of time T ($\geq$t).

In the case of t=T, for example, whenever the transmission rate B is derived, it is checked whether the derived transmission rate is larger or smaller than the bit rate of the coded data resulted with the coding method set in the encoding schedule. Then, if the bit rate exceeds the transmission rate B, the encoding schedule is changed so as to include the encoding method which provides the coded data having a bit rate not larger than the transmission rate B.

It is also possible to detect the transmission rate B immediately before the timing to change the encoding schedule or immediately after the timing to change the previous encoding schedule, and to change the encoding schedule based on the detected transmission rate B.

Further, change of the encoding schedule may be performed, for example, whenever such a process is repeated S times (S is an integer of one or more) as that the server 1 transmits an audio signal and the client terminal 3 having received the audio signal transmits the acknowledge signal ACK.

In the above case with S being two or more, the transmission rate B can be detected two or more times for a period of time from one change of the encoding schedule to the next change thereof. When the transmission rate B can be detected two or more times, the encoding schedule may be changed based on either one of the detected transmission rates B, or two or more thereof.

When changing the encoding schedule based on one of the two or more detected transmission rates B, the encoding schedule can be changed based on a maximum or minimum value of the transmission rates B which is detected from among them. In this case, it is desirable to employ a minimum value than a maximum value from the standpoint of safety (i.e., the standpoint of preventing transmission of the audio signal from becoming too late for the start of reproduction thereof).

Also, when changing the encoding schedule based on the two or more detected transmission rates B, the encoding schedule can be changed based on, for example, an average value of them, or a middle value between maximum and minimum values thereof (an average value of the maximum and minimum values).

As described above, since the transmission rate of the network 2 is detected and the encoding schedule is changed to employ the coding method which provides the coded data having a bit rate adapted for the transmission rate of the network 2, the server 1 selects the encoder for encoding an audio signal into the coded data with the adapted coding method, and therefore transmission of the coded data is avoided from becoming too late to reproduce the audio signal in real time.

In the case of the network 2 comprising Internet, for example, the protocol called RTP (Real-time Transport Protocol), which is specified in RFC 1889 (issued by IFTE), is usable. In this case, since the transmission time is assigned to each packet for use in RTP, the transmission rate B can be derived based on the transmission time assigned to the packet rather than the above formula (1).

Also, in the case of employing the above-mentioned RSVP, since the reserved band (transmission rate) is secured until disconnection of the communication link, it is not required to detect the transmission rate B and to change the encoding schedule during transmission of audio signals in step S8 of FIG. 9, taking into account that the transmission rate varies with time. In other words, the use of RSVP eliminates the need of changing the encoding schedule in consideration of a variation in the transmission rate with time once the encoding schedule is planed based on the transmission rate to be secured before starting transmission of audio signals.

Further, the transmission rate may be detected in the client terminal 3 instead of the server 1, and then transmitted to the client terminal 3 from the server 1.

When the coding method set in the encoding schedule is changed during transmission of the coded data as described above, the client terminal 3 must have a decoder capable of decoding the coded data resulted with the changed coding method.

Figure 16:
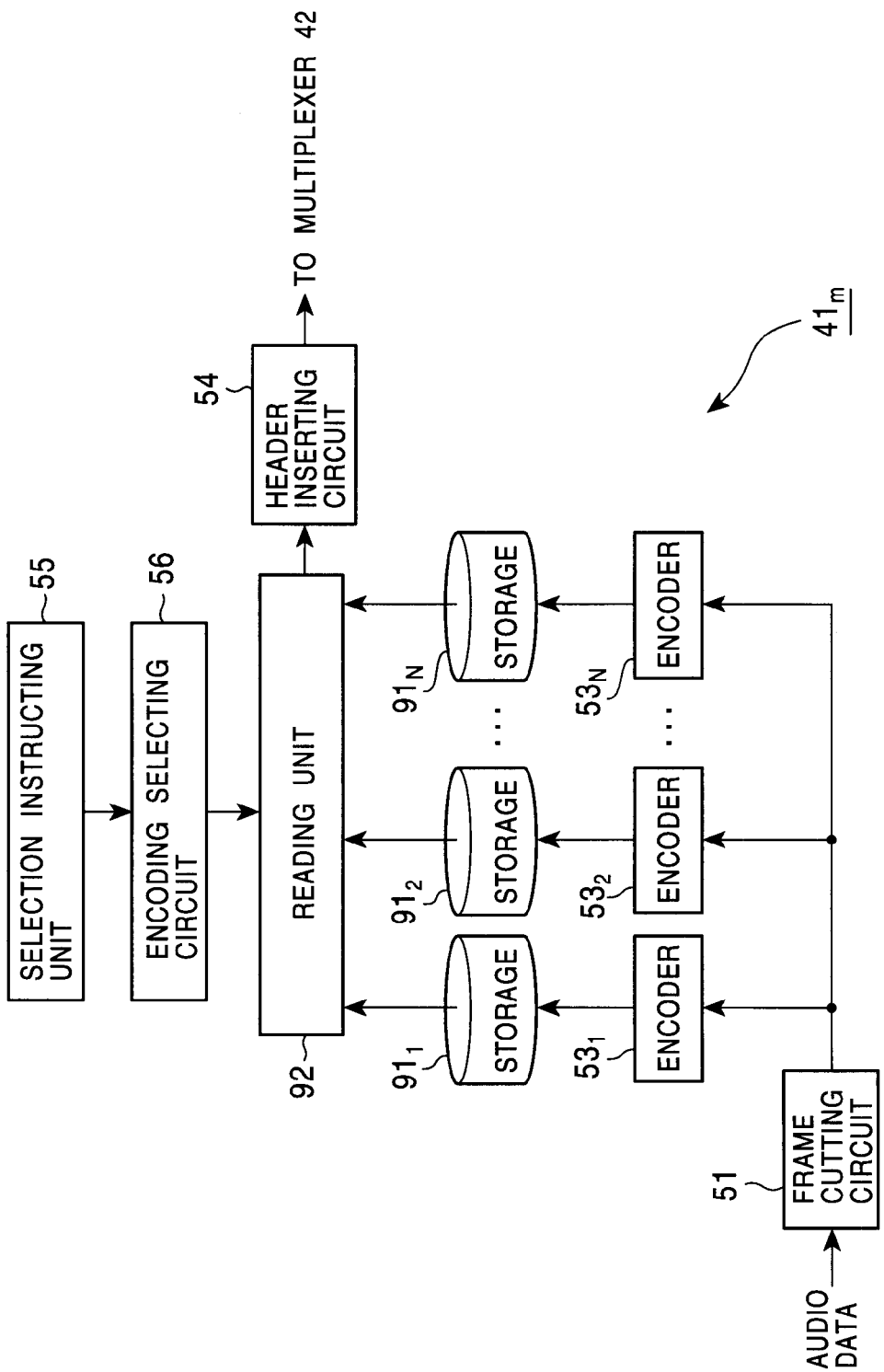
FIG. 16 is a block diagram showing another exemplified construction of the coding unit $41_m$ in FIG. 4.

Next, FIG. 16 shows another exemplified construction of the coding unit $41_m$ in FIG. 4. Note that components corresponding to those in FIG. 5 are denoted by the same numerals.

In the embodiment shown in FIG. 5, the switch 52 is controlled to select one of the encoders $53_1$ to $53_N$, and an audio signal is decoded by the selected encoder, followed by being transmitted. Processing executed in that embodiment is however somewhat complicated because an audio signal requires to be encoded in response to each request for the audio signal.

With the view of making the processing simpler, in an embodiment shown in FIG. 6, an audio signal is previously encoded into coded data by each of the encoders $53_1$ to $53_N$ and stored in each of storages $91_1$ to $91_N$ comprising, e.g., magnetic disks (hard disks), MOes (magneto-optical disks), optical disks, magnetic tapes, or phase change disks. Then, a reading unit 56 selects one of the storages $91_1$ to $91_N$ under control of the encoding selecting circuit 56 and reads the coded data out of the selected storage.

More specifically, each frame outputted from the frame cutting circuit 51 is supplied to all of the encoders $53_1$ to $53_N$ and encoded into coded data. The coded data obtained by the encoders $53_1$ to $53_N$ are supplied to and stored (recorded) in the storages $91_1$ to $91_N$, respectively.

Thereafter, when a request for an audio signal is issued from the client terminal 3, the encoding selecting circuit 56 controls the reading unit 92 in accordance with an instruction based on the encoding schedule provided from the selection instructing unit 55. Then, the reading unit 92 selects one of the storages $91_1$ to $91_N$ corresponding to the instruction from the selection instructing unit 55 and reads the coded data out of the selected storage. The read-out coded data is supplied to the header inserting circuit 54, followed by being transmitted as described above.

With the encoder $41_m$ described above, the scale of the server 1 is increased because the storages $91_1$ to $91_N$ are required additionally and the encoders $53_1$ to $53_N$ must be operated in parallel in the case of taking in the audio signal in real time, while the need of encoding an audio signal in response to each request for the audio signal is eliminated.

Figure 17:
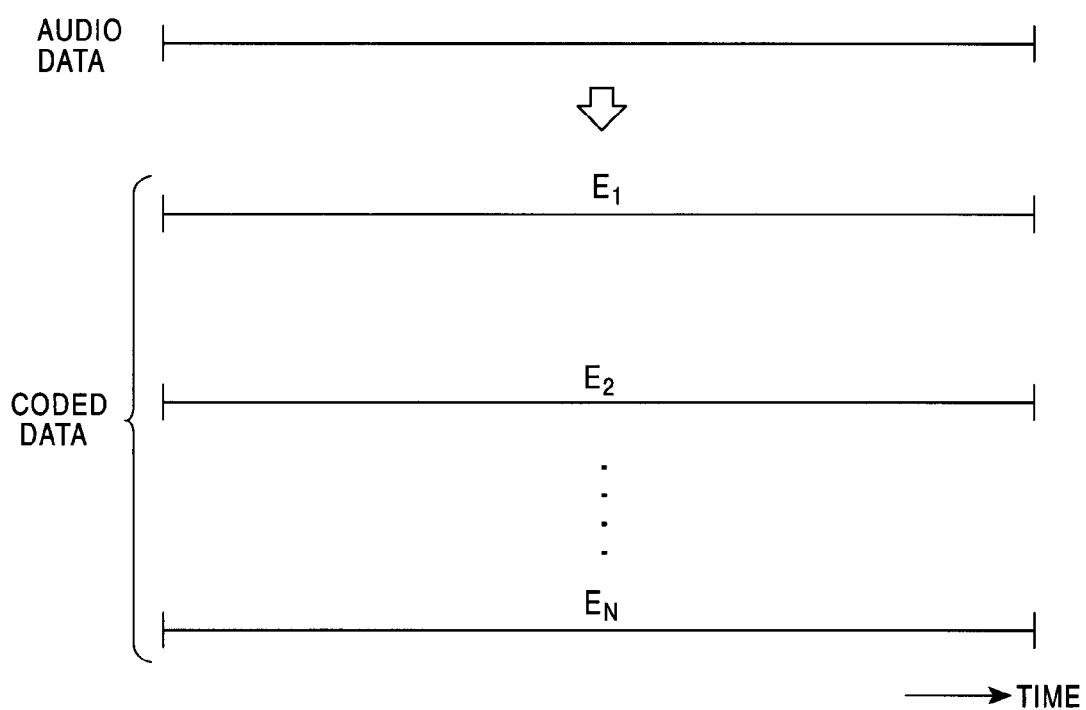
FIG. 17 is a chart for explaining a method of transmitting coded data to the client terminal.

As described above in connection with FIG. 11, the illustrated embodiment is constructed to encode each portion of a time-series audio signal into coded data with one appropriate coding method successively. In the case, for example, where real-time reproduction is not required, or where the transmission rate is sufficiently large even when real-time reproduction is required, however, coded data $E_1$ to $E_N$ resulted from encoding a time-series audio signal by the encoders $53_1$ to $53_N$, for example, may be all transmitted to the client terminal 3 as shown in FIG. 17. In this case, the client terminal 3 can select the coded signal resulted with the desired coding method, and decode the selected coded data to reproduce the audio signal.

Also, while audio signals are processed in the illustrated embodiment, the present invention is also applicable to other signals such as video signals, other types of time-series signals, and signals being not in time series.

Moreover, the network 2 may be a wire or wireless system so long as it is a bidirectional network.

The encoders $53_1$ to $53_N$ as components of the server 1 and the decoders $83_1$ to $83_{N'}$ as components of the client terminal 3 can be realized by rendering a CPU (an information processing unit or a computer) to execute a computer program (software) as described above, or by dedicated hardware. However, when decoders installed in the client terminal 3 are all constructed of hardware, it is difficult to update the decoders from the server 1.

When the processing executed by the server 1 and the client terminal 3 is realized with a computer program, the computer program may be provided in the form of a recording medium such as a CD-ROM (Compact Disc—Read Only Memory) on which it is recorded, or may be provided by transmission via Internet or any other suitable transmitting medium.

Additionally, the encoders $41_1$ to $41_M$ in FIG. 4 are able to encode audio data in accordance with the same encoding schedule or different encoding schedules planned independently of one another.

According to the transmitting apparatus and method and the providing medium as described in the above embodiments, one coding method for encoding a part or the whole of a digital signal is instructed from among a plurality of coding methods, and coded data obtained with the instructed coding method is selected. To the selected coded data, coding method information indicating the coding method used for obtaining the selected coded data is added. The coded data can be therefore decoded in accordance with the coding method information.

According to the receiving apparatus and method and the providing medium as described in the above embodiments, coding method information added to coded data and indicating a coding method used for obtaining the coded data is extracted, and a decoding method to decode the coded data is recognized based on the extracted coding method information. Therefore, even when the coded data is encoded with various coding methods, for example, it is possible to decode the coded data.

According to the providing medium as described in the above embodiments, coded data and coding method information are provided which are obtained by instructing, from among a plurality of coding methods, one for encoding a part or the whole of a digital signal, selecting coded data resulted from encoding the digital signal with the instructed coding method, and adding, to the selected coded data, coding method information indicating the coding method used for obtaining the selected coded data. The coded data can be therefore decoded in accordance with the coding method information.

According to the transmitting apparatus and method and the providing medium as described in the above embodiments, a transmission rate of a transmission line is detected, and one coding method capable of providing coded data having a bit rate corresponding to the detected transmission rate of the transmission line is selected. Therefore, in the case of decoding and reproducing the coded data in real time, for example, transmission of the coded data can be avoided from becoming too late.

According to the receiving apparatus and method and the providing medium as described in the above embodiments, coded data encoded by a coding method capable of providing data having a bit rate corresponding to a transmission rate of a transmission line is received, and the received coded data is decoded. The coded data can be therefore decoded in real time.

What is claimed is:

1. A transmitting apparatus for transmitting coded data resulted from encoding a digital signal via a predetermined transmission line, said transmitting apparatus comprising:
   a plurality of coding means for encoding said digital signal with a plurality of coding methods and outputting said coded data,
   detecting means for detecting a transmission rate of said transmission line,
   selecting means for selecting one of said plurality of coding methods which is able to provide coded data having a bit rate corresponding to the transmission rate of said transmission line, and
   transmitting means for transmitting said coded data obtained with the coding method selected by selecting means.

2. A transmitting apparatus according to claim 1, wherein said selecting means selects one of said plurality of coding means which outputs coded data having a bit rate corresponding to the transmission rate of said transmission line, thereby causing said digital signal to be encoded by the selected coding means, and
   said transmitting means transmits the coded data outputted from the selected coding means.

3. A transmitting apparatus according to claim 1, further comprising a plurality of storage means for storing a plurality of coded data resulted from encoding said digital signal by said plurality of coding means,
   wherein said selecting means selects, from among said plurality of coded data stored in said plurality of storage means, one which has a bit rate corresponding to the transmission rate of said transmission line.

4. A transmitting apparatus according to claim 1, wherein said detecting means detects the transmission rate of said transmission line by determining a communication time required for transferring a predetermined amount of data between said transmitting apparatus and a receiving apparatus for receiving said coded data, and deriving the transmission rate based on the communication time.

5. A transmitting apparatus according to claim 4, wherein said detecting means determines the communication time by measuring the same.

6. A transmitting apparatus according to claim 4, wherein when data transferred between said transmitting apparatus and said receiving apparatus for receiving said coded data is added with the transmission time at which said data has been transmitted,
   said detecting means determines the communication time based on the transmission time.

7. A transmitting apparatus according to claim 1, wherein when said transmitting means transmits said coded data while securing a predetermined transmission rate for said transmission line,
   said selecting means selects one of said plurality of coding methods which is able to provide coded data having a bit rate corresponding to the predetermined transmission rate.

8. A transmitting apparatus according to claim 1, wherein at the start of transmission of said coded data, said selecting means selects the coding method capable of providing coded data having a bit rate corresponding to the transmission rate of said transmission line detected by said detecting means.

9. A transmitting apparatus according to claim 1, wherein after the start of transmission of said coded data, said selecting means changes selection of the coding method based on the transmission rate of said transmission line detected by said detecting means.

10. A transmitting apparatus according to claim 9, wherein said detecting means detects the transmission rate of said transmission line by determining a communication time required for transferring a predetermined amount of data between said transmitting apparatus and a receiving apparatus for receiving said coded data, and deriving the transmission rate based on the communication time.

11. A transmitting apparatus according to claim 9, wherein said detecting means detects the transmission rate of said transmission line whenever data is transferred between said transmitting apparatus and a receiving apparatus for receiving said coded data, and said selecting means changes selection of the coding method based on the transmission rate of said transmission line whenever the transmission rate of said transmission line is detected by said detecting means.

12. A transmitting apparatus according to claim 9, wherein said detecting means detects the transmission rate of said transmission line whenever data is transferred between said transmitting apparatus and a receiving apparatus for receiving said coded data, and said selecting means changes selection of the coding method based on the transmission rate of said transmission line whenever the transmission rate of said transmission line is detected by said detecting means a predetermined plural number of times.

13. A transmitting apparatus according to claim 12, wherein said selecting means changes selection of the coding method based on two or more values of the transmission rates of said transmission line detected by said detecting means plural times.

14. A transmitting apparatus according to claim 13, wherein said selecting means changes selection of the coding method based on an average value or a middle value between maximum and minimum values of the transmission rates of said transmission line detected by said detecting means plural times.

15. A transmitting apparatus according to claim 12, wherein said selecting means changes selection of the coding method based on a maximum value or a minimum value of the transmission rates of said transmission line detected by said detecting means plural times.

16. A transmitting apparatus according to claim 1, further comprising adding means for adding, to the coded data obtained with the coding method selected by said selecting means, coding method information indicating the selected coding method.

17. A transmitting method for use in a transmitting apparatus for transmitting coded data resulted from encoding a digital signal via a predetermined transmission line, wherein:

said transmitting apparatus comprises a plurality of coding means for encoding said digital signal with a plurality of coding methods and outputting said coded data, and said transmitting method comprises a detecting step of detecting a transmission rate of said transmission line, a selecting step of selecting one of said plurality of coding methods which is able to provide coded data having a bit rate corresponding to the transmission rate of said transmission line, and a transmitting step of transmitting said coded data obtained with the coding method selected in said selecting step.

18. A transmitting method according to claim 17, wherein said selecting step selects one of said plurality of coding means which outputs coded data having a bit rate corresponding to the transmission rate of said transmission line, thereby causing said digital signal to be encoded by the selected coding means, and said transmitting step transmits the coded data outputted from the selected coding means.

19. A transmitting method according to claim 17, further comprising a plurality of storage means for storing a plurality of coded data resulted from encoding said digital signal by said plurality of coding means, wherein said selecting step selects, from among said plurality of coded data stored in said plurality of storage means, one which has a bit rate corresponding to the transmission rate of said transmission line.

20. A transmitting method according to claim 17, wherein said detecting step detects the transmission rate of said transmission line by determining a communication time required for transferring a predetermined amount of data between said transmitting apparatus and a receiving apparatus for receiving said coded data, and deriving the transmission rate based on the communication time.

21. A transmitting method according to claim 20, wherein said detecting step determines the communication time by measuring the same.

22. A transmitting method according to claim 20, wherein when data transferred between said transmitting apparatus and said receiving apparatus for receiving said coded data is added with the transmission time at which said data has been transmitted, said detecting step determines the communication time based on the transmission time.

23. A transmitting method according to claim 17, wherein when said transmitting step transmits said coded data while securing a predetermined transmission rate for said transmission line, said selecting step selects one of said plurality of coding methods which is able to provide coded data having a bit rate corresponding to the predetermined transmission rate.

24. A transmitting method according to claim 17, wherein at the start of transmission of said coded data, said selecting step selects the coding method capable of providing coded data having a bit rate corresponding to the transmission rate of said transmission line detected in said detecting step.

25. A transmitting method according to claim 17, wherein after the start of transmission of said coded data, said selecting step changes selection of the coding method based on the transmission rate of said transmission line detected in said detecting step.

26. A transmitting method according to claim 25, wherein said detecting step detects the transmission rate of said transmission line by determining a communication time required for transferring a predetermined amount of data between said transmitting apparatus and a receiving apparatus for receiving said coded data, and deriving the transmission rate based on the communication time.

27. A transmitting method according to claim 25, wherein said detecting step detects the transmission rate of said transmission line whenever data is transferred between said transmitting apparatus and a receiving apparatus for receiving said coded data, and said selecting step changes selection of the coding method based on the transmission rate of said transmission line whenever the transmission rate of said transmission line is detected in said detecting step.

28. A transmitting method according to claim 25, wherein said detecting step detects the transmission rate of said transmission line whenever data is transferred between said transmitting apparatus and a receiving apparatus for receiving said coded data, and said selecting step changes selection of the coding method based on the transmission rate of said transmission line whenever the transmission rate of said transmission line is detected in said detecting step a predetermined plural number of times.

29. A transmitting method according to claim 28, wherein said selecting step changes selection of the coding method based on two or more values of the transmission rates of said transmission line detected in said detecting step plural times.

30. A transmitting method according to claim 29, wherein said selecting step changes selection of the coding method based on an average value or a middle value between maximum and minimum values of the transmission rates of said transmission line detected in said detecting step plural times.

31. A transmitting method according to claim 28, wherein said selecting step changes selection of the coding method based on a maximum value or a minimum value of the transmission rates of said transmission line detected in said detecting step plural times.

32. A transmitting method according to claim 17, further comprising an adding step of adding, to the coded data obtained with the coding method selected in said selecting step, coding method information indicating the selected coding method.

33. A providing medium for providing a computer program for rendering a computer to execute processing to transmit coded data resulted from encoding a digital signal via a predetermined transmission line, wherein:

said computer comprises a plurality of coding means for encoding said digital signal with a plurality of coding methods and outputting said coded data, and said computer program includes a detecting step of detecting a transmission rate of said transmission line, a selecting step of selecting one of said plurality of coding methods which is able to provide coded data having a bit rate corresponding to the transmission rate of said transmission line, and a transmitting step of transmitting said coded data obtained with the coding method selected in said selecting step.

34. A providing medium according to claim 33, wherein said selecting step selects one of said plurality of coding means which outputs coded data having a bit rate corresponding to the transmission rate of said transmission line, thereby causing said digital signal to be encoded by the selected coding means, and said transmitting step transmits the coded data outputted from the selected coding means.

35. A providing medium according to claim 33, wherein said computer further comprises a plurality of storage means for storing a plurality of coded data resulted from encoding said digital signal by said plurality of coding means, wherein said selecting step selects, from among said plurality of coded data stored in said plurality of storage means, one which has a bit rate corresponding to the transmission rate of said transmission line.

36. A providing medium according to claim 33, wherein said detecting step detects the transmission rate of said transmission line by determining a communication time required for transferring a predetermined amount of data between said computer and a receiving apparatus for receiving said coded data, and deriving the transmission rate based on the measured communication time.

37. A providing medium according to claim 36, wherein said detecting step determines the communication time by measuring the same.

38. A providing medium according to claim 36, wherein when data transferred between said computer and said receiving apparatus for receiving said coded data is added with the transmission time at which said data has been transmitted, said detecting step determines the communication time based on the transmission time.

39. A providing medium according to claim 33, wherein when said transmitting step transmits said coded data while securing a predetermined transmission rate for said transmission line, said selecting step selects one of said plurality of coding methods which is able to provide coded data having a bit rate corresponding to the predetermined transmission rate.

40. A providing medium according to claim 33, wherein at the start of transmission of said coded data, said selecting step selects the coding method capable of providing coded data having a bit rate corresponding to the transmission rate of said transmission line detected in said detecting step.

41. A providing medium according to claim 33, wherein after the start of transmission of said coded data, said selecting step changes selection of the coding method based on the transmission rate of said transmission line detected in said detecting step.

42. A providing medium according to claim 41, wherein said detecting step detects the transmission rate of said transmission line by determining a communication time required for transferring a predetermined amount of data between said computer and a receiving apparatus for receiving said coded data, and deriving the transmission rate based on the communication time.

43. A providing medium according to claim 41, wherein said detecting step detects the transmission rate of said transmission line whenever data is transferred between said computer and a receiving apparatus for receiving said coded data, and said selecting step changes selection of the coding method based on the transmission rate of said transmission line whenever the transmission rate of said transmission line is detected in said detecting step.

44. A providing medium according to claim 41, wherein said detecting step detects the transmission rate of said transmission line whenever data is transferred between said computer and a receiving apparatus for receiving said coded data, and said selecting step changes selection of the coding method based on the transmission rate of said transmission line whenever the transmission rate of said transmission line is detected in said detecting step a predetermined plural number of times.

45. A providing medium according to claim 44, wherein said selecting step changes selection of the coding method based on two or more values of the transmission rates of said transmission line detected in said detecting step plural times.

46. A providing medium according to claim 45, wherein said selecting step changes selection of the coding method based on an average value or a middle value between maximum and minimum values of the transmission rates of said transmission line detected in said detecting step plural times.

47. A providing medium according to claim 44, wherein said selecting step changes selection of the coding method based on a maximum value or a minimum value of the transmission rates of said transmission line detected in said detecting step plural times.

48. A providing medium according to claim 33, further comprising an adding step of adding, to the coded data obtained with the coding method selected in said selecting step, coding method information indicating the selected coding method.

* * * * *